United States Patent
Chen et al.

(10) Patent No.: US 11,259,267 B2
(45) Date of Patent: Feb. 22, 2022

(54) DOWNLINK DATA TRANSMISSION METHOD AND DEVICE

(71) Applicant: CHINA ACADEMY OF TELECOMMUNICATIONS TECHNOLOGY, Beijing (CN)

(72) Inventors: Li Chen, Beijing (CN); Chandrika Kumudinie Worrall, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 63 days.

(21) Appl. No.: 16/321,007

(22) PCT Filed: Jun. 22, 2017

(86) PCT No.: PCT/CN2017/089491
§ 371 (c)(1),
(2) Date: Jan. 25, 2019

(87) PCT Pub. No.: WO2018/019060
PCT Pub. Date: Feb. 1, 2018

(65) Prior Publication Data
US 2019/0182801 A1    Jun. 13, 2019

(30) Foreign Application Priority Data
Jul. 27, 2016  (CN) .......................... 201610601767.9

(51) Int. Cl.
*H04W 4/00* (2018.01)
*H04W 68/00* (2009.01)
*H04W 76/11* (2018.01)
*H04W 72/12* (2009.01)
(Continued)

(52) U.S. Cl.
CPC ..... *H04W 68/005* (2013.01); *H04W 72/1273* (2013.01); *H04W 76/11* (2018.02); *H04W 88/04* (2013.01); *H04W 92/10* (2013.01)

(58) Field of Classification Search
CPC ..... H04W 72/04; H04W 88/08; H04W 76/00; H04W 68/005; H04W 76/11; H04W 72/1273; H04W 88/04
See application file for complete search history.

(56) References Cited

U.S. PATENT DOCUMENTS

2007/0265016 A1* 11/2007 Kahtava ............... H04L 1/08
455/452.2
2010/0069041 A1    3/2010 Wang
(Continued)

FOREIGN PATENT DOCUMENTS

CN    101026858 A    8/2007
CN    101159971 A    4/2008
(Continued)

OTHER PUBLICATIONS

3GPP TSG RAN WG2 Meeting #94, Light connection DRX paging cycle and mechanism, May 23-27, 2016, R2-163632 (Year: 2016).*
(Continued)

*Primary Examiner* — Siren Wei
(74) *Attorney, Agent, or Firm* — Harness, Dickey & Pierce, P.L.C.

(57) ABSTRACT

A downlink data transmission method and a downlink data transmission device are provided. The downlink data transmission method includes: transmitting a paging message to a UE which has not been connected to any individual cell when downlink data is to be transmitted to the UE; and notifying the UE to receive the downlink data.

13 Claims, 8 Drawing Sheets

(51) Int. Cl.
  *H04W 88/04* (2009.01)
  *H04W 92/10* (2009.01)

(56) References Cited

U.S. PATENT DOCUMENTS

| | | | | |
|---|---|---|---|---|
| 2010/0111028 A1* | 5/2010 | Kim | ...................... | H04W 76/28 370/329 |
| 2011/0269448 A1* | 11/2011 | Chen | ..................... | H04W 48/12 455/422.1 |
| 2012/0281566 A1* | 11/2012 | Pelletier | ................ | H04W 76/27 370/252 |

FOREIGN PATENT DOCUMENTS

| | | |
|---|---|---|
| CN | 101895986 A | 11/2010 |
| CN | 102215566 A | 10/2011 |
| EP | 14306767.6 A1 | 11/2016 |

OTHER PUBLICATIONS

3GPP TR 23.799 V0.6.0 (Jul. 2016), 3rd Generation Partnership Project; Technical Specification Group Services and System Aspects; Study on Architecture for Next Generation System (Release 14).

3GPP TS 36.331 V11.16.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 11).

European Patent Office, Communication, PCT/CN2017089491, dated Dec. 8, 2019, China Academy of Telecommunications Technology, Supplementary European Search Report.

3GPP TSG RAN WG2 Meeting #94, Nanjing, China, May 23-27, 2016, R2-163632, Agenda item: 8.9.1, Source Intel Corporation, Title: Light connection DRX paging cycle and mechanism, Document for Discussion and decision.

Patent Cooperation Treaty, Written Opinion of the International Searching Authority, dated Sep. 11, 2017, PCT/CN2017/089491, China Academy of Telecommunications Technology.

The Second Office Action, the State Intellectual Property Office of People's Republic of China, 201610601767.9, China Academy of Telecommunications Technology, Downlink Data Transmission Method and Device.

R2-164807, Gothenburg, Sweden, Aug. 22-26, 2016, Source: Catt, Title: Support Data Transmission in Inactive State, Agenda Item: 9.4.3.1, Document For: Discussion and Decision.

* cited by examiner

DOWNLINK DATA TRANSMISSION METHOD AND DEVICE

CROSS-REFERENCE TO RELATED APPLICATION

The present application claims a priority of the Chinese patent application No. 201610601767.9 filed on Jul. 27, 2016, which is incorporated herein by reference in its entirety.

TECHNICAL FIELD

The present disclosure relates to the field of communication technology, in particular to a downlink data transmission method and a downlink data transmission device.

BACKGROUND

Along with the development of the wireless communication system, various User Equipments (UEs) and services have emerged, and it is necessary to meet the requirements on the various services while reducing the power consumption for the UEs and saving network resources. In order to reduce the power consumption and achieve the rapid data transmission, an inactive state has been introduced for the UE. In the inactive state, the UE may maintain its connection with a core network, but without any air interface connection, i.e., there is no connection between the UE and a specific cell for data transmission at any time. The UE in the inactive state is not associated with the specific cell. A network side device merely knows a region where the UE is located, and it is impossible for the network side device to directly schedule an air interface and transmit data through the air interface.

In the inactive state, a Radio Access Network (RAN) identity, i.e., an inactive UE ID (also called as resume ID), which is valid merely in a certain region, is allocated by the network side device for the UE, so as to identify the UE in the inactive state. A network may find the UE in accordance with the inactive UE ID, or the UE may enter in a connected state using the inactive UE ID when it initiates an uplink access operation. The inactive UE ID is different from a globally unique International Mobile Subscriber Identification Number (IMSI) or a Cell Radio Network Temporary Identifier (C-RNTI), and it has a length between the IMSI and the C-RNTI (e.g., the length of the inactive UE ID is 40 bits, while the length of the C-RNTI is 16 bits). In addition, the inactive UE ID is merely valid in a certain region where a plurality of cells or evolved Nodes B (eNBs) is located. When the UE moves beyond the region, it is necessary for the UE to update its inactive UE ID.

Among the related UE states, the network side device may directly transmit data to and receive data from the UE in a Radio Resource Control (RRC) connected state for which a unique UE air-interface transmission identifier, e.g., the C-RNTI, has been allocated. When it is necessary to transmit the data, the UE in the other state needs to enter the RRC connected state, establish a RRC connection so as to acquire the C-RNTI, and then perform the subsequent data transmission. Due to this procedure, the data may not be transmitted rapidly when it arrives, and thereby a certain data transmission delay may occur.

SUMMARY

An object of the present disclosure is to provide a downlink data transmission method and a downlink data transmission device, so as to reduce the data transmission delay.

In one aspect, the present disclosure provides in some embodiments 1. A downlink data transmission method, comprising: transmitting a paging message to a User Equipment (UE) which has not been connected to any individual cell when downlink data is to be transmitted to the UE; and notifying the UE to receive the downlink data.

In some embodiments, the paging message comprises: an inactive UE Identity (ID) and a unique UE air-interface transmission identifier; or the inactive UE ID, the unique UE air-interface transmission identifier, and a combination of a downlink data reception instruction and a public resource configuration information; or the inactive UE ID, the unique UE air-interface transmission identifier, and resource information adopted by the UE for transmitting a paging feedback message to a base station; or the inactive UE ID, the unique UE air-interface transmission identifier, the source information adopted by the UE for transmitting the paging feedback message to the base station, and a combination of the downlink data reception instruction and the public resource configuration information.

In some embodiments, when the paging message does not comprise the public resource configuration information and the source information adopted by the UE for transmitting the paging feedback message to the base station, the notifying the UE to receive the downlink data comprises: transmitting a downlink scheduling command to the UE, the downlink scheduling command comprising the unique UE air-interface transmission identifier; and transmitting the downlink data on a resource indicated by the downlink scheduling command.

In some embodiments, when the paging message comprises the public resource configuration information but does not comprise the source information adopted by the UE for transmitting the paging feedback message to the base station, the notifying the UE to receive the downlink data comprises: transmitting a downlink scheduling command to the UE so as to indicate parts of or all public resources for the downlink transmission, the downlink scheduling command comprising the unique UE air-interface transmission identifier; and transmitting the downlink data on the public resources indicated by the downlink scheduling command.

In some embodiments, when the paging message comprises the source information adopted by the UE for transmitting the paging feedback message to the base station, subsequent to transmitting the paging message to the UE, the downlink data transmission method further comprises receiving the paging feedback message from the UE.

In some embodiments, when the paging message does not comprise the public resource configuration information, the notifying the UE to receive the downlink data comprises: transmitting, by the base station which has received the paging feedback message, a downlink scheduling command to the UE, the downlink scheduling command comprising the unique UE air-interface transmission identifier; and transmitting, by the base station which has received the paging feedback message, the downlink data on a resource indicated by the downlink scheduling command.

In some embodiments, when the paging message comprises the public resource configuration information, the notifying the UE to receive the downlink data comprises: transmitting, by the base station which has received the paging feedback message, a downlink scheduling command to the UE so as to indicate parts of or all public resources for the downlink transmission, the downlink scheduling command comprising the unique UE air-interface transmission identifier; and transmitting, by the base station which has received the paging feedback message, the downlink data on the public resources indicated by the downlink scheduling command.

In some embodiments, the paging message comprises: an inactive UE ID; or the inactive UE ID and any combination of a public air-interface transmission identifier, a downlink data reception instruction and public resource configuration information; or the inactive UE ID and a resource adopted by the UE for transmitting a paging feedback message to a base station; or the inactive UE ID, the resource adopted by the UE for transmitting the paging feedback message to the base station, and any combination of the public air-interface transmission identifier, the downlink data reception instruction and the public resource configuration information.

In some embodiments, when the paging message does not comprise the public resource configuration information, the notifying the UE to receive the downlink data comprises: transmitting a downlink scheduling command to the UE, the downlink scheduling command comprising the public air-interface transmission identifier; and transmitting the downlink data and a control unit comprising the inactive UE ID on a resource indicated by the downlink scheduling command.

In some embodiments, when the paging message comprises the public resource configuration information, the notifying the UE to receive the downlink data comprises: transmitting a downlink scheduling command to the UE so as to indicate parts of or all public resources for the downlink transmission, the downlink scheduling command comprising the public air-interface transmission identifier; and transmitting the downlink data and a control unit comprising the inactive UE ID on the public resources indicated by the downlink scheduling command.

In some embodiments, when the paging message comprises the resource adopted by the UE for transmitting the paging feedback message to the base station, subsequent to transmitting the paging message to the UE, the downlink data transmission method further comprises receiving the paging feedback message from the UE.

In some embodiments, when the paging message does not comprise the public resource configuration information, the notifying the UE to receive the downlink data comprises: transmitting, by the base station which has received the paging feedback message, a downlink scheduling command to the UE, the downlink scheduling command comprising the public air-interface transmission identifier; and transmitting, by the base station which has received the paging feedback message, the downlink data and a control unit comprising the inactive UE ID on a resource indicated by the downlink scheduling command.

In some embodiments, when the paging message comprises the public resource configuration information, the notifying the UE to receive the downlink data comprises: transmitting, by the base station which has received the paging feedback message, a downlink scheduling command to the UE so as to indicate parts of or all public resources for the downlink transmission, the downlink scheduling command comprising the public air-interface transmission identifier; and transmitting, by the base station which has received the paging feedback message, the downlink data and a control unit comprising the inactive UE ID on the public resources indicated by the downlink scheduling command.

In another aspect, a downlink data transmission method includes: receiving paging messages from one or more base stations; and receiving downlink data from a first base station among the one or more base stations.

In some embodiments, each paging message comprises: an inactive UE ID and a unique UE air-interface transmission identifier; or the inactive UE ID, the unique UE air-interface transmission identifier, and a combination of a downlink data reception instruction and public resource configuration information, wherein the receiving the paging messages from the one or more base stations comprises: determining, by a UE, whether each paging message is provided for the UE itself in accordance with the inactive UE ID in the paging message; and when the paging message is provided for the UE itself, acquiring, by the UE, the unique UE air-interface transmission identifier in the paging message.

In some embodiments, when the paging message does not comprise the public resource configuration information, the receiving the downlink data from the first base station among the one or more base stations comprises: receiving a downlink scheduling command from the base station, the downlink scheduling command comprising the unique UE air-interface transmission identifier; and receiving the downlink data on a resource indicated by the downlink scheduling command.

In some embodiments, when the paging message comprises the public resource configuration information, the receiving the downlink data from the first base station among the one or more base stations comprises: receiving a downlink scheduling command from the first base station so as to indicate parts of or all public resources for the downlink transmission, the downlink scheduling command comprising the unique UE air-interface transmission identifier; and receiving the downlink data on the public resources indicated by the downlink scheduling command.

In some embodiments, the paging message comprises: an inactive UE ID, a unique UE air-interface transmission identifier and a resource adopted by the UE for transmitting a paging feedback message to the base station; or the inactive UE ID, the unique UE air-interface transmission identifier, the resource adopted by the UE for transmitting the paging feedback message to the base station, and a combination of a downlink data reception instruction and public resource configuration information, wherein the receiving the paging messages from the one or more base stations comprises: determining, by the UE, whether each paging message is provided for the UE itself in accordance with the inactive UE ID in the paging message; and when the paging message is provided for the UE itself, acquiring the unique UE air-interface transmission identifier in the paging message, and determining an uplink resource for the paging feedback message in accordance with the resource adopted by the UE for transmitting the paging feedback message to the base station.

In some embodiments, subsequent to receiving the paging messages from the one or more base stations, the downlink data transmission method further comprises transmitting the paging feedback message on the uplink resource of the paging feedback message.

In some embodiments, when the paging message does not comprise the public resource configuration information, the receiving the downlink data from the first base station among the one or more base stations comprises: receiving a downlink scheduling command from the first base station, the downlink scheduling command comprising the unique UE air-interface transmission identifier, the first base station being a base station which has received the paging feedback message; and receiving the downlink data on a resource indicated by the downlink scheduling command.

In some embodiments, when the paging message comprises the public resource configuration information, the receiving the downlink data from the first base station among the one or more base stations comprises: receiving a downlink scheduling command from the first base station so as to indicate parts of or all public resources for the downlink transmission, the downlink scheduling command comprising the unique UE air-interface transmission identifier, the first base station being a base station which has received the paging feedback message; and receiving the downlink data on the public resources indicated by the downlink scheduling command.

In some embodiments, the paging message comprises: an inactive UE ID; or the inactive UE ID, and any combination of a public air-interface transmission identifier, a downlink data reception instruction and public resource configuration information, wherein the receiving the paging messages from the one or more base stations comprises: determining, by a UE, whether each paging message is provided for the UE itself in accordance with the inactive UE ID in the paging message; and when the paging message is provided for the UE itself and comprises the public air-interface transmission identifier, acquiring the public air-interface transmission identifier in the paging message, and otherwise, acquiring a preset public air-interface transmission identifier.

In some embodiments, when the paging message does not comprise the public resource configuration information, the receiving the downlink data from the first base station among the one or more base stations comprises: receiving a downlink scheduling command from the first base station, the downlink scheduling command comprising the public air-interface transmission identifier; receiving the downlink data and a control unit comprising an inactive UE ID on a resource indicated by the downlink scheduling command; and comparing the inactive UE ID in the control unit with the inactive UE ID in the paging message, and when they are consistent with each other, acquiring the downlink data.

In some embodiments, when the paging message comprises the public resource configuration information, the receiving the downlink data from the first base station among the one or more base stations comprises: receiving a downlink scheduling command from the first base station so as to indicate parts of or all public resources for the downlink transmission, the downlink scheduling command comprising the public air-interface transmission identifier; receiving the downlink data and a control unit comprising an inactive UE ID on the public resources indicated by the downlink scheduling command; and comparing the inactive UE ID in the control unit with the inactive UE ID in the paging message, and when they are consistent with each other, acquiring the downlink data.

In some embodiments, the paging message comprises: an inactive UE ID and a resource adopted by a UE for transmitting a paging feedback message to the base station; or the inactive UE ID, the resource adopted by the UE for transmitting the paging feedback message to the base station, and any combination of a public air-interface transmission identifier, a downlink data reception instruction and public resource configuration information, wherein the receiving the paging messages from the one or more base stations comprises: determining, by the UE, whether each paging message is provided for the UE itself in accordance with the inactive UE ID in the paging message; when the paging message is provided for the UE itself and comprises the public air-interface transmission identifier, acquiring the public air-interface transmission identifier in the paging message, and otherwise acquiring a preset public air-interface transmission identifier; and determining an uplink resource for the paging feedback message in accordance with the resource adopted by the UE for transmitting the paging feedback message to the base station.

In some embodiments, subsequent to receiving the paging messages from the one or more base stations, the downlink data transmission method further comprises transmitting the paging feedback message on the uplink resource of the paging feedback message.

In some embodiments, when the paging message does not comprise the public resource configuration information, the receiving the downlink data from the first base station among the one or more base stations comprises: receiving a downlink scheduling command from the first base station, the downlink scheduling command comprising the public air-interface transmission identifier, the first base station being a base station which has received the paging feedback message; receiving the downlink data and a control unit comprising an inactive UE ID on a resource indicated by the downlink scheduling instruction; and comparing the inactive UE ID in the control unit with a pre-stored inactive UE ID, and when they are consistent with each other, acquiring the downlink data.

In some embodiments, when the paging message comprises the public resource configuration information, the receiving the downlink data from the first base station among the one or more base stations comprises: receiving a downlink scheduling command from the first base station so as to indicate parts of or all public resources for the downlink transmission, the downlink scheduling command comprising the public air-interface transmission identifier, the first base station being a base station which has received the paging feedback message; receiving the downlink data and a control unit comprising an inactive UE ID on the public resources indicated by the downlink scheduling command; and comparing the inactive UE ID in the control unit with the inactive UE ID in the paging message, and when they are consistent with each other, acquiring the downlink data.

In yet another aspect, a downlink data transmission device includes: a transmission module configured to transmit a paging message to a UE which has not been connected to any individual cell when downlink data is to be transmitted to the UE; and a notification module configured to notify the UE to receive the downlink data.

In some embodiments, the paging message comprises: an inactive UE ID and a unique UE air-interface transmission identifier; or the inactive UE ID, the unique UE air-interface transmission identifier, and a combination of a downlink data reception instruction and a public resource configuration information; or the inactive UE ID, the unique UE air-interface transmission identifier, and resource information adopted by the UE for transmitting a paging feedback message to a base station; or the inactive UE ID, the unique UE air-interface transmission identifier, the source information adopted by the UE for transmitting the paging feedback message to the base station, and a combination of the downlink data reception instruction and the public resource configuration information.

In some embodiments, when the paging message comprises the resource information adopted by the UE for transmitting the paging feedback message to the base station, the downlink data transmission device further comprises a reception module configured to receive the paging feedback message from the UE.

In some embodiments, when the paging message does not comprise the public resource configuration information, the notification module comprises: a command transmission sub-module configured to transmit a downlink scheduling command to the UE, the downlink scheduling command comprising the unique UE air-interface transmission identifier; and a data transmission sub-module configured to transmit the downlink data on a resource indicated by the downlink scheduling command.

In some embodiments, when the paging message comprises the public resource configuration information, the notification module comprises: a command transmission sub-module configured to transmit a downlink scheduling command to the UE so as to indicate parts of or all public resources for the downlink transmission, the downlink scheduling command comprising the unique UE air-interface transmission identifier; and a data transmission sub-module configured to transmit the downlink data on the public resources indicated by the downlink scheduling command.

In some embodiments, the paging message comprises: an inactive UE ID; or the inactive UE ID and any combination of a public air-interface transmission identifier, a downlink data reception instruction and public resource configuration information; or the inactive UE ID and a resource adopted by the UE for transmitting a paging feedback message to a base station; or the inactive UE ID, the resource adopted by the UE for transmitting the paging feedback message to the base station, and any combination of the public air-interface transmission identifier, the downlink data reception instruction and the public resource configuration information.

In some embodiments, when the paging message comprises the resource adopted by the UE for transmitting the paging feedback message to the base station, the downlink data transmission device further comprises a reception module configured to receive the paging feedback message from the UE.

In some embodiments, when the paging message does not comprise the public resource configuration information, the notification module comprises: a command transmission sub-module configured to transmit a downlink scheduling command to the UE, the downlink scheduling command comprising the public air-interface transmission identifier; and a data transmission sub-module configured to transmit the downlink data and a control unit comprising the inactive UE ID on a resource indicated by the downlink scheduling command.

In some embodiments, when the paging message comprises the public resource configuration information, the notification module comprises: a command transmission sub-module configured to transmit a downlink scheduling command to the UE so as to indicate parts of or all public resources for the downlink transmission, the downlink scheduling command comprising the public air-interface transmission identifier; and a data transmission sub-module configured to transmit the downlink data and a control unit comprising the inactive UE ID on the public resources indicated by the downlink scheduling command.

In yet another aspect, a downlink data transmission device includes: a message reception module configured to receive paging messages from one or more base stations; and a data reception module configured to receive downlink data from a first base station among the one or more base stations.

In some embodiments, each paging message comprises: an inactive UE ID and a unique UE air-interface transmission identifier; or the inactive UE ID, the unique UE air-interface transmission identifier, and a combination of a downlink data reception instruction and public resource configuration information.

In some embodiments, the message reception module comprises: a determination sub-module configured to determine whether each paging message is provided for a UE itself in accordance with the inactive UE ID in the paging message; and an identifier acquisition sub-module configured to, when the paging message is provided for the UE itself, acquire the unique UE air-interface transmission identifier in the paging message.

In some embodiments, when the paging message does not comprise the public resource configuration information, the data reception module comprises: a command reception sub-module configured to receive a downlink scheduling command from the first base station, the downlink scheduling command comprising the unique UE air-interface transmission identifier; and a data reception sub-module configured to receive the downlink data on a resource indicated by the downlink scheduling command.

In some embodiments, when the paging message comprises the public resource configuration information, the data reception module comprises: a command reception sub-module configured to receive a downlink scheduling command from the first base station so as to indicate parts of or public resources for the downlink transmission, the downlink scheduling command comprising the unique UE air-interface transmission identifier; and a data reception sub-module configured to receive the downlink data on the public resources indicated by the downlink scheduling command.

In some embodiments, the paging message comprises: an inactive UE ID, a unique UE air-interface transmission identifier and a resource adopted by the UE for transmitting a paging feedback message to the base station; or the inactive UE ID, the unique UE air-interface transmission identifier, the resource adopted by the UE for transmitting the paging feedback message to the base station, and a combination of a downlink data reception instruction and public resource configuration information.

In some embodiments, the message reception module comprises: a determination sub-module configured to determine whether each paging message is provided for a UE itself in accordance with the inactive UE ID in the paging message; and an acquisition sub-module configured to, when the paging message is provided for the UE itself, acquire the unique UE air-interface transmission identifier in the paging message, and determine an uplink resource for the paging feedback message in accordance with the resource adopted by the UE for transmitting the paging feedback message to the base station.

In some embodiments, when the paging message comprises the resource adopted by the UE for transmitting the paging feedback message to the base station, the downlink data transmission device further comprises a transmission module configured to transmit the paging feedback message on the uplink resource of the paging feedback message.

In some embodiments, when the paging message does not comprise the public resource configuration information, the data reception module comprises: a command reception sub-module configured to receive a downlink scheduling command from the first base station, the downlink scheduling command comprising the unique UE air-interface transmission identifier, the first base station being a base station which has received the paging feedback message;

and a data reception sub-module configured to receive the downlink data on a resource indicated by the downlink scheduling command.

In some embodiments, when the paging message comprises the public resource configuration information, the data reception module comprises: a command reception sub-module configured to receive a downlink scheduling command from the first base station so as to indicate parts of or all public resources for the downlink transmission, the downlink scheduling command comprising the unique UE air-interface transmission identifier, the first base station being a base station which has received the paging feedback message; and a data reception sub-module configured to receive the downlink data on the public resources indicated by the downlink scheduling command.

In some embodiments, the paging message comprises: an inactive UE ID; or the inactive UE ID, and any combination of a public air-interface transmission identifier, a downlink data reception instruction and public resource configuration information.

In some embodiments, the message reception module comprises: a determination sub-module configured to determine whether the paging message is provided for the UE itself in accordance with the inactive UE ID in the paging message; and an identifier acquisition sub-module configured to, when the paging message is provided for the UE itself and comprises the public air-interface transmission identifier, acquire the public air-interface transmission identifier in the paging message, and otherwise acquire a preset public air-interface transmission identifier.

In some embodiments, when the paging message does not comprise the public resource configuration information, the data reception module comprises: a command reception sub-module configured to receive a downlink scheduling command from the first base station, the downlink scheduling command comprising the public air-interface transmission identifier; a data reception sub-module configured to receive the downlink data and a control unit comprising an inactive UE ID on a resource indicated by the downlink scheduling command; and a data acquisition sub-module configured to compare the inactive UE ID in the control unit with the inactive UE ID in the paging message, and when they are consistent with each other, acquire the downlink data.

In some embodiments, when the paging message comprises the public resource configuration information, the data reception module comprises: a command reception sub-module configured to receive a downlink scheduling command from the first base station so as to indicate parts of or all public resources for the downlink transmission, the downlink scheduling command comprising the public air-interface transmission identifier; a data reception sub-module configured to receive the downlink data and a control unit comprising an inactive UE ID on the public resources indicated by the downlink scheduling command; and a data acquisition sub-module configured to compare the inactive UE ID in the control unit with the inactive UE ID in the paging message, and when they are consistent with each other, acquire the downlink data.

In some embodiments, the paging message comprises: an inactive UE ID and a resource adopted by a UE for transmitting a paging feedback message to the base station; or the inactive UE ID, the resource adopted by the UE for transmitting the paging feedback message to the base station, and any combination of a public air-interface transmission identifier, a downlink data reception instruction and public resource configuration information.

In some embodiments, the message reception module comprises: a determination sub-module configured to determine whether the paging message is provided for the UE itself in accordance with the inactive UE ID in the paging message; an acquisition sub-module configured to, when the paging message is provided for the UE itself and comprises the public air-interface transmission identifier, acquire the public air-interface transmission identifier in the paging message, and otherwise acquire a preset public air-interface transmission identifier; and a resource determination sub-module configured to determine an uplink resource for the paging feedback message in accordance with the resource adopted by the UE for transmitting the paging feedback message to the base station.

In some embodiments, the downlink data transmission device further includes a transmission module configured to transmit the paging feedback message on the uplink resource of the feedback paging message.

In some embodiments, when the paging message does not comprise the public resource configuration information, the data reception module comprises: a command reception sub-module configured to receive a downlink scheduling command from the first base station, the downlink scheduling command comprising the public air-interface transmission identifier; a data reception sub-module configured to receive the downlink data and a control unit comprising an inactive UE ID on a resource indicated by the downlink scheduling command; and a data acquisition sub-module configured to compare the inactive UE ID in the control unit with a pre-stored inactive UE ID, and when they are consistent with each other, acquire the downlink data.

In some embodiments, when the paging message comprises the public resource configuration information, the data reception module comprises: a command reception sub-module configured to receive a downlink scheduling command from the first base station so as to indicate parts of or all public resources for the downlink transmission, the downlink scheduling command comprising the public air-interface transmission identifier; a data reception sub-module configured to receive the downlink data and a control unit comprising an inactive UE ID on the public resources indicated by the downlink scheduling command; and a data acquisition sub-module configured to compare the inactive UE ID in the control unit with the inactive UE ID in the paging message, and when they are consistent with each other, acquire the downlink data.

According to the embodiments of the present disclosure, when the downlink data needs to be transmitted to the UE which has not been connected to any individual cell yet, the base station may transmit the paging message to the UE, and notify the UE to receive the downlink data. The UE may receive the downlink data in accordance with the paging information from the base station. As a result, it is able to prevent the occurrence of data transmission delay as compared with the related art where the subsequent data transmission is performed merely when the UE has entered a RRC connected state and acquired a C-RNTI, thereby to transmit the data rapidly and reduce the data transmission delay.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

The schemes in the embodiments of the present disclosure may be applied to different network deployment structures. For ease of description, two possible network deployment structures for a future mobile communication system will be described hereinafter.

Deployment structure 1: base station+UE

Figure 1:
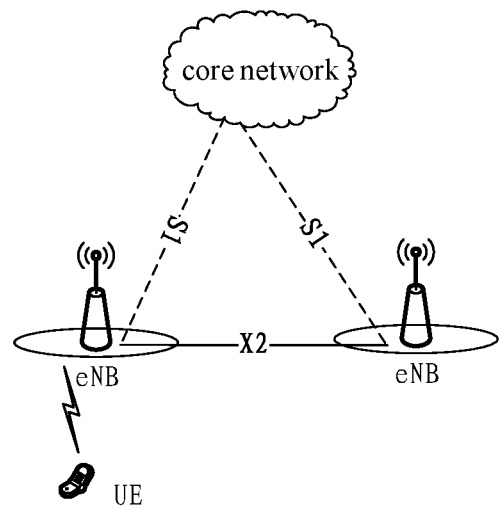
FIG. 1 is a schematic view showing an application architecture according to some embodiments of the present disclosure.

FIG. 1 shows a typical Long Term Evolution (LTE) architecture. In this architecture, each evolved Node B (eNB) corresponds to a plurality of cells, and each UE in a connected state receives data from and transmits data to a corresponding cell through an air-interface. The UE in the connected state is assigned with a unique UE ID, i.e., CNTI, in the corresponding cell.

Deployment structure 2: network side node (including central units (CUs) and a distributed Units (DUs))+UE side node (i.e., UEs)

Figure 2:
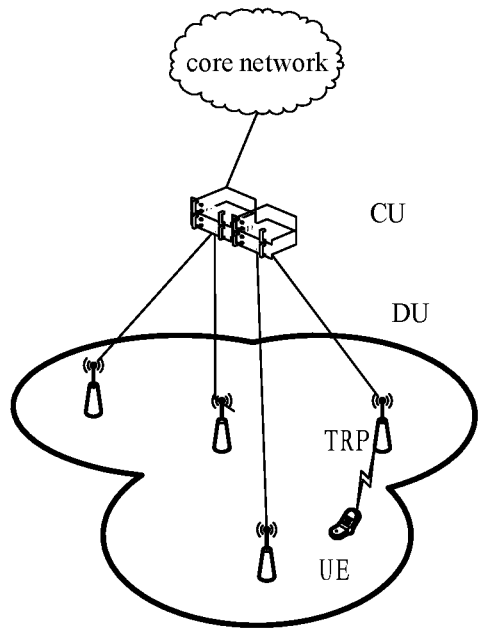
FIG. 2 is another schematic view showing the application architecture according to some embodiments of the present disclosure.

FIG. 2 shows a possible architecture adopted by a future 5$^{th}$-Generation (5G) mobile communication system. In this architecture, the network side node includes CUs and DUs. Each CU controls a plurality of DUs deployed at a certain region, and these DUs communicate with UEs through Transmission Reception Points (TRPs). Each UE may be served by one or more TRPs simultaneously, so as to perform the data transmission. At this time, it is necessary for the network side node to allocate a unique UE air-interface identifier for each UE, so as to schedule and transmit the data, and this identifier may be a C-RNTI or TRP-RNTI.

For ease of description, the unique UE identifier of the UE in a connected state may be called as a unique UE air-interface transmission identifier, e.g., the C-RNTI in a conventional LTE system. A unique identifier of a UE in an inactive state at the region may be called as an inactive UE ID. The nodes for transmitting and receiving radio signaling or data at a network side, including the eNB in the deployment structure 1 or the CUs/DUs (e.g., TRPs) in the deployment structure 2, may be collectively called as base station.

In order to transmit downlink data rapidly and reduce the data transmission delay, when the downlink data needs to be transmitted to a UE which has not been connected to any individual cell, one or more base stations at the region may transmit paging messages to the UE, so as to notify the UE to receive the downlink data. The UE may receive the paging messages from the one or more base stations, and then receive the downlink data from a first base station among the one or more base stations. The first base station may include any one or more base stations among the one or more base stations, or a base station which has received a paging feedback message from the UE.

When the UE has not been connected to any individual cell, it means that the UE is in a newly-introduced state, i.e., an inactive state. The following behaviors are allowed in the inactive state.

(1) A fully or partial connection is maintained between a core network and a Radio Access Network (RAN) side node (e.g., the base station or CU) (e.g., the connection may be maintained at a control plane rather than at a user plane). (2) The mobility is executed by the UE. At a region pre-configured at the network side, intercell migration is performed through cell reselection rather than handover. (3) The UE is allocated with a unique UE ID, i.e., an inactive UE ID (or resume ID), at the region pre-configured at the network side. The pre-configured region includes a plurality of cells corresponding to one or more base stations, so as to simplify the mobility for the UE and meanwhile improve the freedom of the mobility.

The one or more base stations refer to all base stations at a region where the inactive UE ID of the UE is valid, or when it is capable of determining an approximate region where the UE is located, all base stations at the approximate region which belongs to the region where the inactive UE ID of the UE is valid (i.e., a subset of all the base stations at the region where the inactive UE ID of the UE is valid).

One or more base stations at the region where the inactive UE ID of the UE is valid may transmit the paging message to the UE, and one or more of the following information may be carried in the paging message.

(1) The inactive UE ID adopted to identify the UE.

(2) An air-interface identifier adopted by the base station for scheduling and transmitting the downlink data (optional). To be specific, the air-interface identifier may include: (21) a unique UE air-interface transmission identifier allocated for the UE, e.g., a C-RNTI; or (22) a public air-interface transmission identifier allocated for a plurality of UEs to schedule and transmit the downlink data, e.g., a Contention-Based RNTI (CB-RNTI). The air-interface transmission identifier shared by the plurality of UEs may be pre-configured, agreed in a protocol, or determined through a system broadcast message.

(3) A downlink data reception instruction (optional). The downlink data reception instruction is adopted to notify the UE to receive subsequent downlink data. Alternatively, when the air-interface identifier for scheduling and transmitting the downlink data has been allocated by the base station for the UE, it may be deemed that the UE needs to receive the subsequent downlink data, and at this time, the downlink data reception instruction is unnecessary.

(4) Public resource configuration information (optional). When a public resource has been configured, the UE may receive and schedule the downlink data merely on the public resource, and otherwise, the UE may receive and schedule the downlink data on all downlink resources available in a current cell.

(5) A resource adopted by the UE for transmitting the paging feedback message to the base station (optional). The UE may transmit the paging feedback message to the base station in the following modes.

Mode 1: a dedicated uplink access sequence code and a time-frequency resource position of the sequence code (if no time-frequency resource position has been indicated, all available transmission resource positions of the dedicated uplink access sequence code in the cell is used).

Mode 2: a Hybrid Automatic Repeat Request (HARQ) feedback resource corresponding to the paging message, e.g., a feedback sequence code on a resource position corresponding to a time-frequency resource position for the paging message. When Mode 2 is adopted, a HARQ feedback sequence adopted by the UE for transmitting the paging feedback message to the base station and a position thereof may be agreed in a protocol, rather than indicated by the base station. It should be appreciated that, an Acknowledgement (ACK) feedback message, rather than a Non-Acknowledgement (NACK) feedback message, is transmitted.

The downlink data transmission refers to that, when the unique UE air-interface transmission identifier allocated for the UE is carried in the paging message, the base station may schedule and transmit the downlink data to the UE through the unique UE air-interface transmission identifier, and when merely the public air-interface transmission identifier is available for the UE, the base station may schedule and transmit the downlink data to the UE through the public air-interface transmission identifier. The downlink data to be transmitted and the inactive UE ID of the UE (for uniquely identifying the UE) may be carried in downlink information. At this time, the downlink information may probably be received by a plurality of UEs from the base station, and each UE may acquire and identify the inactive UE ID, so as to determine whether the downlink data is transmitted to the UE itself.

When the UE does not transmit the paging feedback message to the base station, the base station needs to transmit the downlink data to the UE in all cells where the paging message is transmitted. When the UE has transmitted the paging feedback message to the base station, the base station may transmit the downlink data to the UE in a cell where the paging feedback message is received.

UE receives the downlink data subsequently, that means the UE may determine identification in accordance with the inactive UE ID in the paging message, and receive and schedule the downlink data in accordance with the information carried in the paging message. If a paging feedback resource has been indicated by the base station, the UE may transmit the paging feedback message to the base station upon the receipt of the paging message, and then the base station which has received the paging feedback message may transmit the downlink data to the UE. If no paging feedback resource has been indicated by the base station, the base station may transmit the downlink data to the UE after the transmission of the paging message.

The downlink data transmission method will be described hereinafter in more details in conjunction with the paging message including different information.

In the following first to fourth embodiments of the present disclosure, the paging message may carry the inactive UE ID, the C-RNTI allocated for the UE, and any other optional information. Within sub-frames with a same paging message, sub-frames having a corresponding time relationship, or any subsequent sub-frames, the base station may allocate a downlink resource for the UE through the C-RNTI, and transmit the downlink data to the UE on the downlink resource.

In the following fifth to eighth embodiments of the present disclosure, the paging message may carry the inactive UE ID, the CB-RNTI shared by a plurality of UEs, and any other optional information. Within sub-frames with a same paging message, sub-frames having a corresponding time relationship, or any subsequent sub-frames, the base station may allocate a downlink resource for the UE through the CB-RNTI, and transmit the downlink data to the UE on the downlink resource. A layer-2 control unit carrying the inactive UE ID (i.e., a Media Access Control Customer Edge (MAC CE) carrying the inactive UE ID) and the downlink data transmitted to the UE are included in the downlink transmission.

Figure 3:
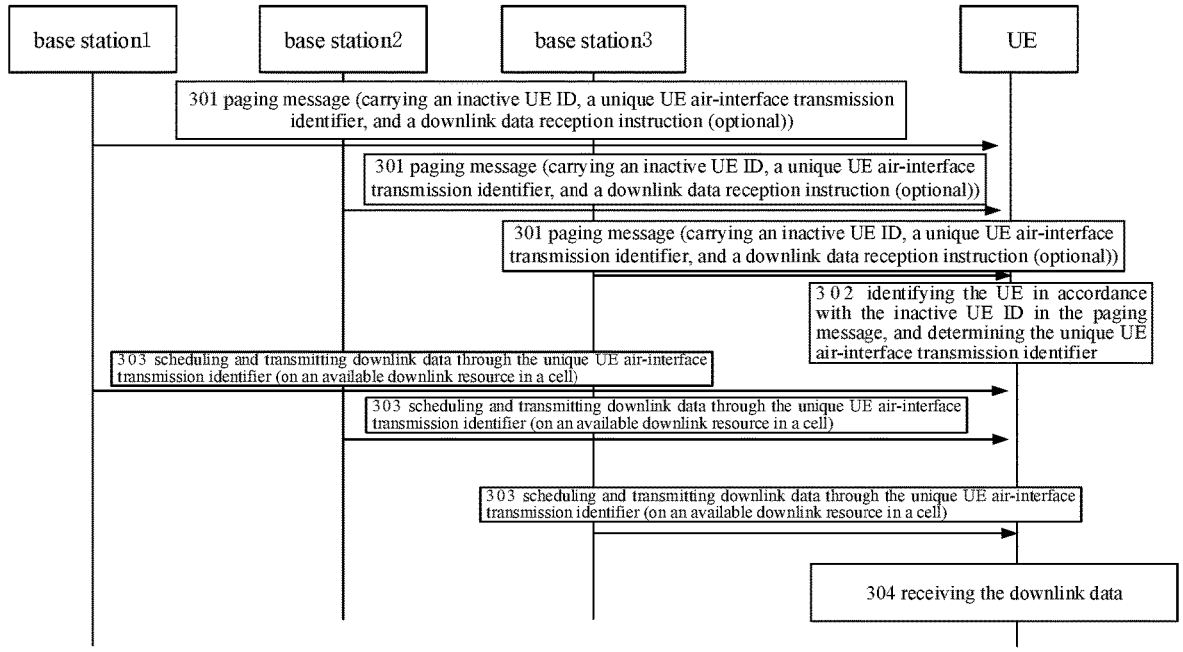
FIG. 3 is a flow chart of a downlink data transmission method according to some embodiments of the present disclosure.

As shown in FIG. 3, the present disclosure provides in some embodiments a downlink data transmission method which includes the following steps.

Step 301: transmitting, by a base station (or a plurality of base stations) a paging message. The paging message may carry (1) a unique UE identifier at a certain region, i.e., an inactive UE ID, (2) a unique UE air-interface transmission identifier, e.g., a C-RNTI, and (3) a downlink data reception instruction (optional).

If the base station transmits the downlink data to a UE immediately after the UE has received the air-interface transmission identifier, the downlink data reception instruction may not be carried in the paging message.

Step 302: receiving, by the UE, the paging message from the base station, identifying the UE in accordance with the inactive UE ID in the paging message, and determining whether the paging message is provided for the UE itself, and when the paging message is provided for the UE itself, determining the unique UE air-interface transmission identifier allocated for the UE.

Step 303: scheduling, by the base station (or base stations), downlink transmission using the unique UE air-interface transmission identifier, and transmitting downlink data to the UE on a resource indicated by a downlink scheduling command.

To be specific, the base station may transmit the downlink scheduling command including the unique UE air-interface transmission identifier to the UE, and transmit the downlink data to the UE on the resource indicated by the downlink scheduling command.

Step 304: receiving, by the UE, the downlink scheduling command including the unique UE air-interface transmission identifier on an available downlink resource in a cell where the paging message has been received, and receiving the downlink data on the resource indicated by the downlink scheduling command.

There is a definite time relationship between a moment when the UE starts to receive the downlink data and a moment when the paging message is transmitted, e.g., within a same Transmission Time Interval (TTI), or TTIs having definite time offsets.

Figure 4:
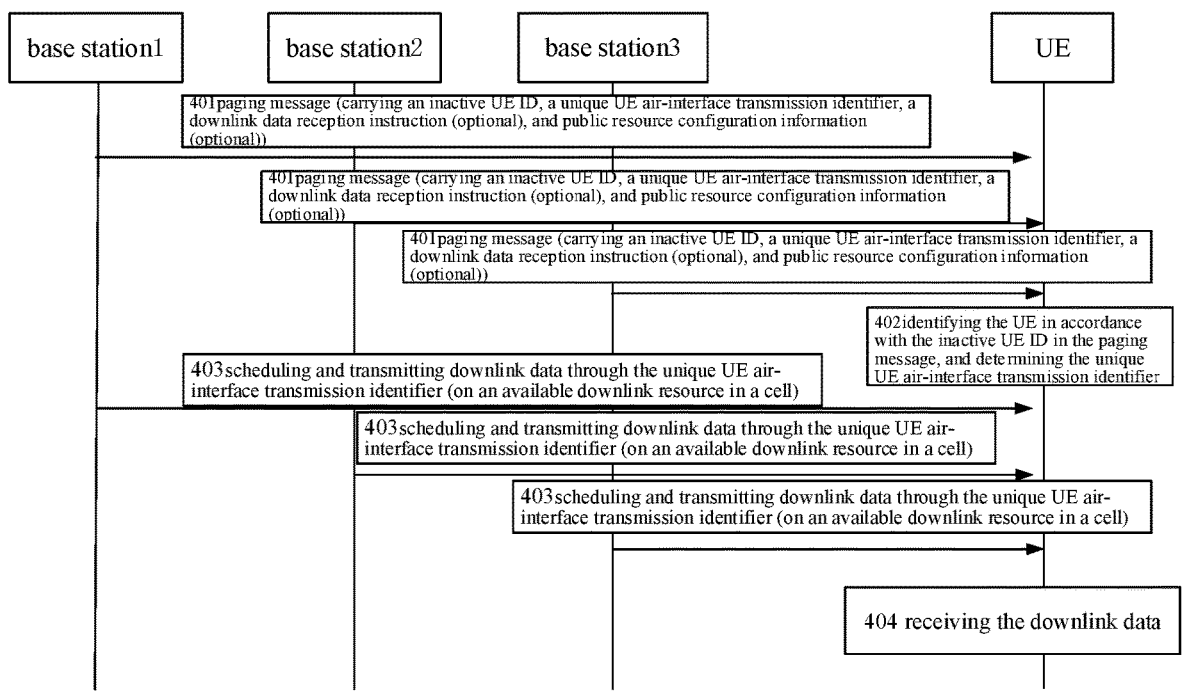
FIG. 4 is another flow chart of the downlink data transmission method according to some embodiments of the present disclosure.

As shown in FIG. 4, the present disclosure further provides in some embodiments a downlink data transmission method, which includes the following steps.

Step 401: transmitting, by a base station (or a plurality of base stations) a paging message. The paging message may carry (1) a unique UE identifier at a certain region, i.e., an inactive UE ID, (2) a unique UE air-interface transmission identifier, e.g., a C-RNTI, (3) a downlink data reception instruction (optional), and (4) public resource configuration information (optional).

If the base station transmits the downlink data to a UE immediately after the UE has received the air-interface transmission identifier, the downlink data reception instruction may not be carried in the paging message. The public resource configuration information may be carried in the paging message optionally. The public resource configuration information may be pre-configured for the UE, agreed in a protocol, configured for the UE when the UE is in a connected state, or notified to all the UEs through a system message.

Step 402: receiving, by the UE, the paging message from the base station, identifying the UE in accordance with the inactive UE ID in the paging message and determining whether the paging message is provided for the UE itself, and when the paging message is provided for the UE itself, determining the unique UE air-interface transmission identifier allocated for the UE.

Step 403: when the paging message includes the public resource configuration information, scheduling, by the base station (or the base stations), downlink transmission through the unique UE air-interface transmission identifier on a downlink public resource, and transmitting the downlink data to the UE on a resource indicated by a downlink scheduling command.

To be specific, the base station (or the base stations) may transmit the downlink scheduling command including the unique UE air-interface transmission identifier to the UE so as to indicate parts of or all public resources for the downlink transmission, and transmit the downlink data to the UE on the public resources indicated by the downlink scheduling command.

When the paging message does not include the public resource configuration information, the base station (or the base stations) may transmit the downlink scheduling command including the unique UE air-interface transmission identifier to the UE, and transmit the downlink data to the UE on a resource indicated by the downlink scheduling command.

Step 404: when the paging message includes the public resource configuration information, receiving, by the UE, the downlink scheduling command including the unique UE air-interface transmission identifier on a downlink public resource in a cell where the paging message has been received, and receiving the downlink data on a resource indicated by the downlink scheduling command.

To be specific, the UE may receive the downlink scheduling command including the unique UE air-interface transmission identifier from the base station, and the downlink scheduling command is adopted to indicate parts of or all public resources for the downlink transmission. Then, the UE may receive the downlink data on the public resources indicated by the downlink scheduling command.

When the paging message does not include the public resource configuration information, the UE may receive the downlink scheduling command including the unique UE air-interface transmission identifier from the base station, and receive the downlink data on a resource indicated by the downlink scheduling command.

There is a definite time relationship between a moment when the UE starts to receive the downlink data and a moment when the paging message is transmitted, e.g., within a same TTI, or TTIs having definite time offsets.

Figure 5:
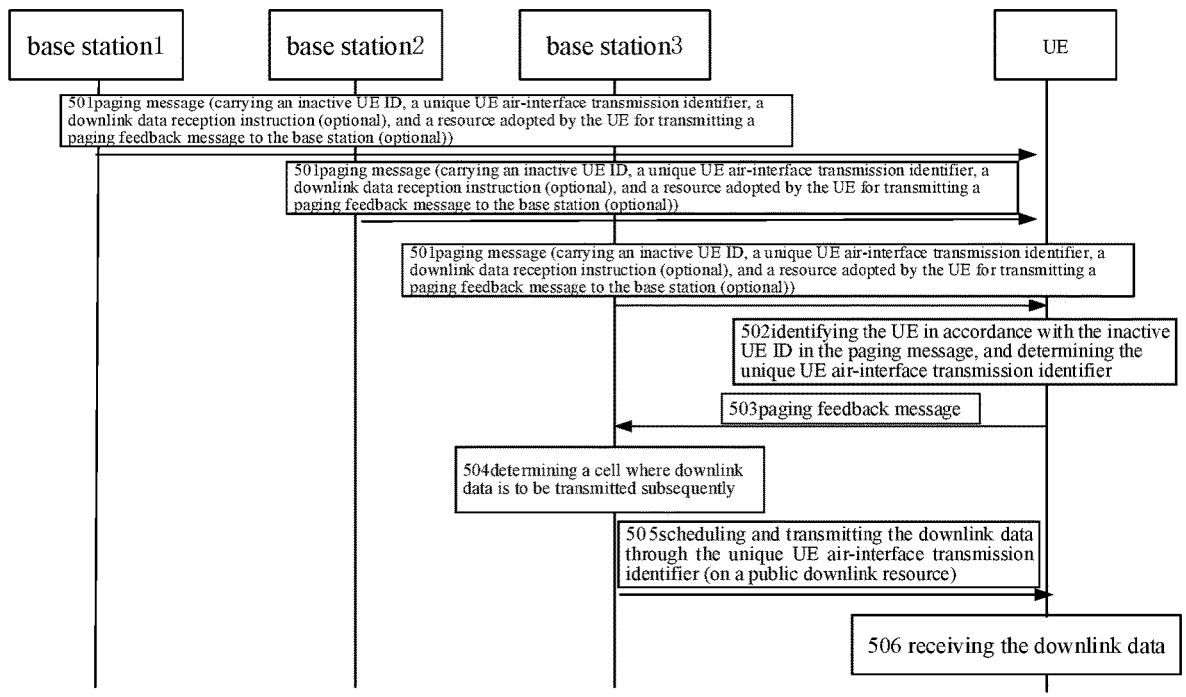
FIG. 5 is yet another flow chart of the downlink data transmission method according to some embodiments of the present disclosure.

As shown in FIG. 5, the present disclosure further provides in some embodiments a downlink data transmission method, which includes the following steps.

Step 501: transmitting, by a base station (or a plurality of base stations) a paging message. The paging message may carry (1) a unique UE identifier at a certain region, i.e., an inactive UE ID, (2) a unique UE air-interface transmission identifier, e.g., a C-RNTI, (3) a downlink data reception instruction (optional), and (4) a resource adopted by a UE for transmitting a paging feedback message to the base station.

If the base station transmits the downlink data to the UE immediately after the UE has received the air-interface transmission identifier, the downlink data reception instruction may not be carried in the paging message.

Step 502: receiving, by the UE, the paging message from the base station, identify the UE in accordance with the inactive UE ID in the paging message and determining whether the paging message is provided for the UE itself, and when the paging message is provided for the UE itself, determining the unique UE air-interface transmission identifier and an uplink resource for the paging feedback message allocated for the UE.

Step 503: transmitting, by the UE, the paging feedback message to the base station on the allocated uplink resource, so as to determine the base station from which the downlink data is to be received subsequently.

Step 504: receiving, by the base station, the paging feedback message from the UE, so as to determine a cell to which the downlink data is to be transmitted.

Step 505: scheduling, by the base station (which has received the paging feedback message), downlink transmission through the unique UE air-interface transmission identifier on an available downlink resource in the cell, and transmitting the downlink data on a resource indicated by a downlink scheduling command.

To be specific, the base station which has received the paging feedback message may transmit the downlink scheduling command including the unique UE air-interface transmission identifier to the UE, and transmit the downlink data to the UE on the resource indicated by the downlink scheduling command.

Step 506: receiving, by the UE, the downlink scheduling command including the unique UE air-interface transmission identifier on an available downlink resource in a cell where the paging message has been received, and receiving the downlink data on the resource indicated by the downlink scheduling command.

To be specific, the UE may receive the downlink scheduling command including the unique UE air-interface transmission identifier from the base station in Step 505, and receive the downlink data on the resource indicated by the downlink scheduling command.

There is a definite time relationship between a moment when the UE starts to receive the downlink data and a moment when the paging message is transmitted, e.g., within a same TTI, or TTIs having definite time offsets.

Figure 6:
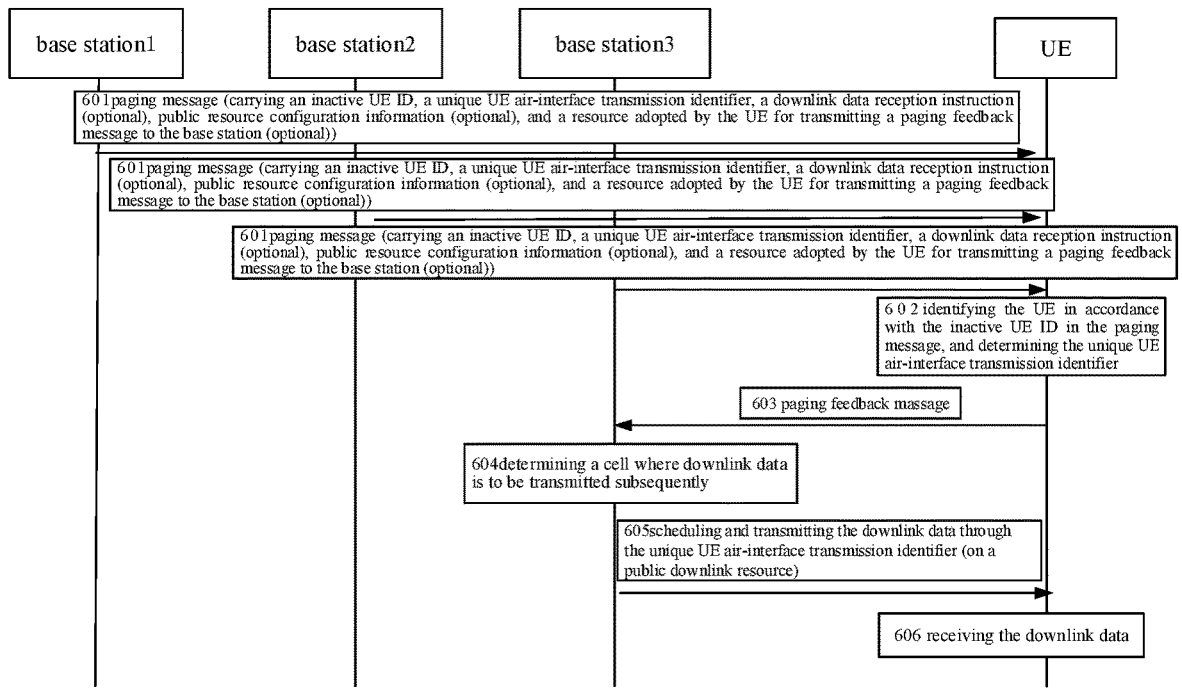
FIG. 6 is still yet another flow chart of the downlink data transmission method according to some embodiments of the present disclosure.

As shown in FIG. 6, the present disclosure further provides in some embodiments a downlink data transmission method, which includes the following steps.

Step 601: transmitting, by a base station (or a plurality of base stations) a paging message. The paging message may carry (1) a unique UE identifier at a certain region, i.e., an inactive UE ID, (2) a unique UE air-interface transmission identifier, e.g., a C-RNTI, (3) a downlink data reception instruction (optional), (4) public resource configuration information (optional), and (5) a resource adopted by a UE for transmitting a paging feedback message to the base station.

If the base station transmits the downlink data to a UE immediately after the UE has received the air-interface transmission identifier, the downlink data reception instruction may not be carried in the paging message. The public resource configuration information may be carried in the paging message optionally. The public resource configuration information may be pre-configured for the UE, agreed in a protocol, configured for the UE when the UE is in a connected state, or notified to all the UEs through a system message.

Step 602: receiving, by the UE, the paging message from the base station, identifying the UE in accordance with the inactive UE ID in the paging message and determining whether the paging message is provided for the UE itself, and when the paging message is provided for the UE itself, determining the unique UE air-interface transmission identifier and an uplink resource for the paging feedback message allocated for the UE.

Step 603: transmitting, by the UE, the paging feedback message to the base station on the allocated uplink resource, so as to determine the base station from which downlink data is to be received by the UE subsequently.

Step 604: receiving, by the base station, the paging feedback message from the UE, so as to determine a cell where the downlink data is to be transmitted subsequently.

Step 605: when the paging message includes the public resource configuration information, scheduling, by the base station (which has received the paging feedback message), downlink transmission through the unique UE air-interface transmission identifier on a downlink public resource configured for the cell, and transmitting the downlink data on a resource indicated by a downlink scheduling command.

To be specific, the base station which has received the paging feedback message may transmit the downlink scheduling command including the unique UE air-interface transmission identifier so as to indicate parts of or all public resources for the downlink transmission, and transmit the downlink data on the public resources indicated by the downlink scheduling command.

When the paging message does not include the public resource configuration information, the base station which has received the paging feedback message may transmit the downlink scheduling command including the unique UE air-interface transmission identifier to the UE, and transmit the downlink data on a resource indicated by the downlink scheduling command.

Step 606: when the paging message includes the public resource configuration information, receiving, by the UE, the downlink scheduling command including the unique UE air-interface transmission identifier on the configured public downlink resource in a cell where the paging message has been received, and receiving the downlink data on a resource indicated by the downlink scheduling command.

To be specific, the UE may receive the downlink scheduling command including the unique UE air-interface transmission identifier from the base station in Step 605, and the downlink scheduling command is adopted to indicate parts of or all public resources for the downlink transmission. Then, the UE may receive the downlink data on the public resources indicated by the downlink scheduling command.

When the paging message does not include the public resource configuration information, the UE may receive the downlink scheduling command including the unique UE air-interface transmission identifier from a base station (i.e., the base station which has received the paging feedback message) in Step 605, and receive the downlink data on the resource indicated by the downlink scheduling command.

There is a definite time relationship between a moment when the UE starts to receive the downlink data and a moment when the paging message is transmitted, e.g., within a same TTI, or TTIs having definite time offsets.

Figure 7:
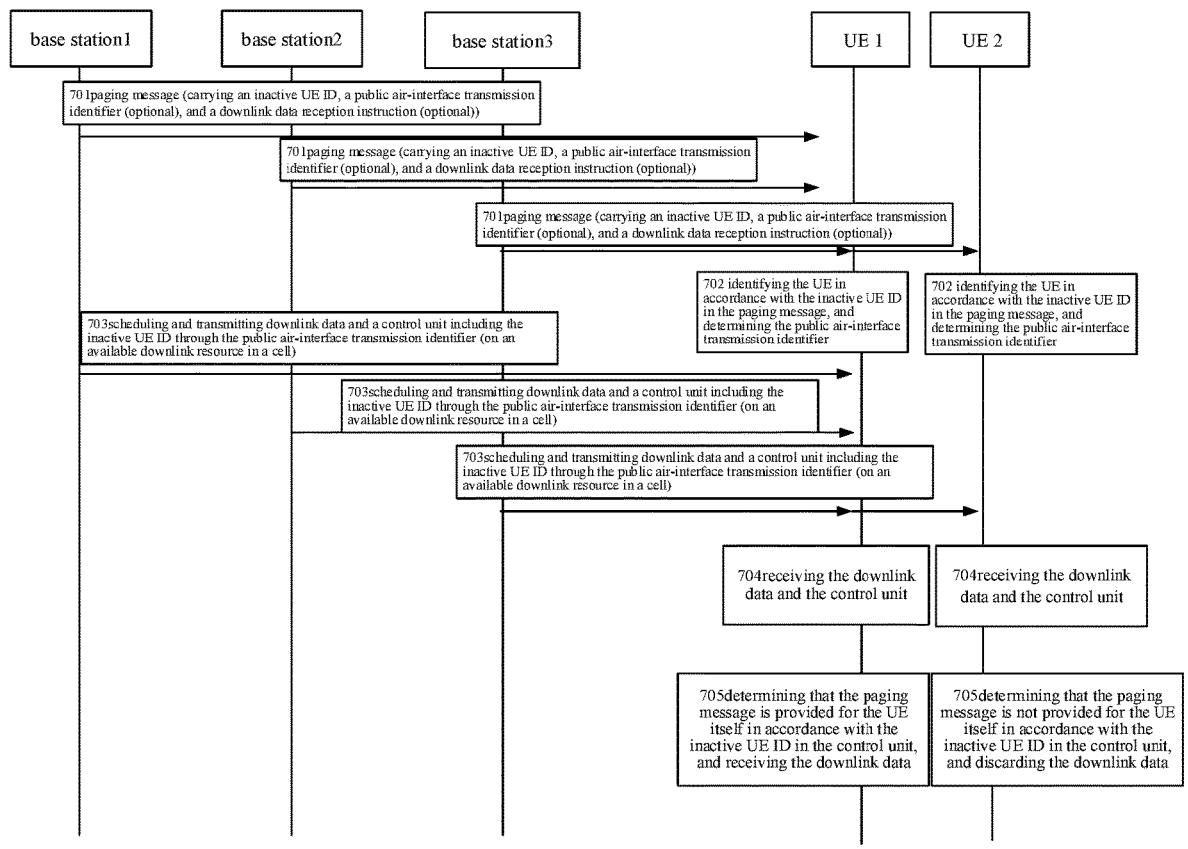
FIG. 7 is still yet another flow chart of the downlink data transmission method according to some embodiments of the present disclosure.

As shown in FIG. 7, the present disclosure further provides in some embodiments a downlink data transmission method, which includes the following steps.

Step 701: transmitting, by a base station (or a plurality of base stations) a paging message. The paging message may carry (1) a unique UE identifier at a certain region, i.e., an inactive UE ID, (2) a public air-interface transmission identifier (optional), e.g., a CB-RNTI, and (3) a downlink data reception instruction (optional).

The public air-interface transmission identifier may be carried in the paging message optionally. The public air-interface transmission identifier may be pre-configured for a UE, agreed in a protocol, or determined through a system broadcast message. When the base station transmits the downlink data to the UE immediately after the UE has received the air-interface transmission identifier, the downlink data reception instruction may not be carried in the paging message.

Step 702: receiving, by the UE, the paging message from the base station, identifying the UE in accordance with the inactive UE ID in the paging message, and determining whether the paging message is provided for the UE itself, and when the paging message is provided for the UE itself, determining the public air-interface transmission identifier.

When the paging message includes a public air-interface transmission identifier, the UE may acquire the public air-interface transmission identifier in the paging message, and otherwise, acquire a predetermined public air-interface transmission identifier.

Step 703: scheduling, by the base station (or the base stations), downlink transmission through the public air-interface transmission identifier, and transmitting a control unit including the inactive UE ID and the downlink data to the UE on a downlink resource indicated by a downlink scheduling command.

To be specific, the base station may transmit the downlink scheduling command including the public air-interface transmission identifier to the UE, and transmit the downlink data and the control unit including the inactive UE ID to the UE on a resource indicated by the downlink scheduling command.

Step 704: receiving, by the UE, the downlink scheduling command including the public air-interface transmission identifier on an available downlink resource in a cell where the paging message has been received, and receiving the downlink data and the control unit including the inactive UE ID on a resource indicated by the downlink scheduling resource.

Step 705: when the inactive UE ID carried in the downlink transmission received by the UE matches an inactive UE ID of the UE, receiving and parsing the downlink data, and otherwise discarding the downlink data.

There is a definite time relationship between a moment when the UE starts to receive the downlink data and a moment when the paging message is transmitted, e.g., within a same TTI, or TTIs having definite time offsets.

Figure 8:
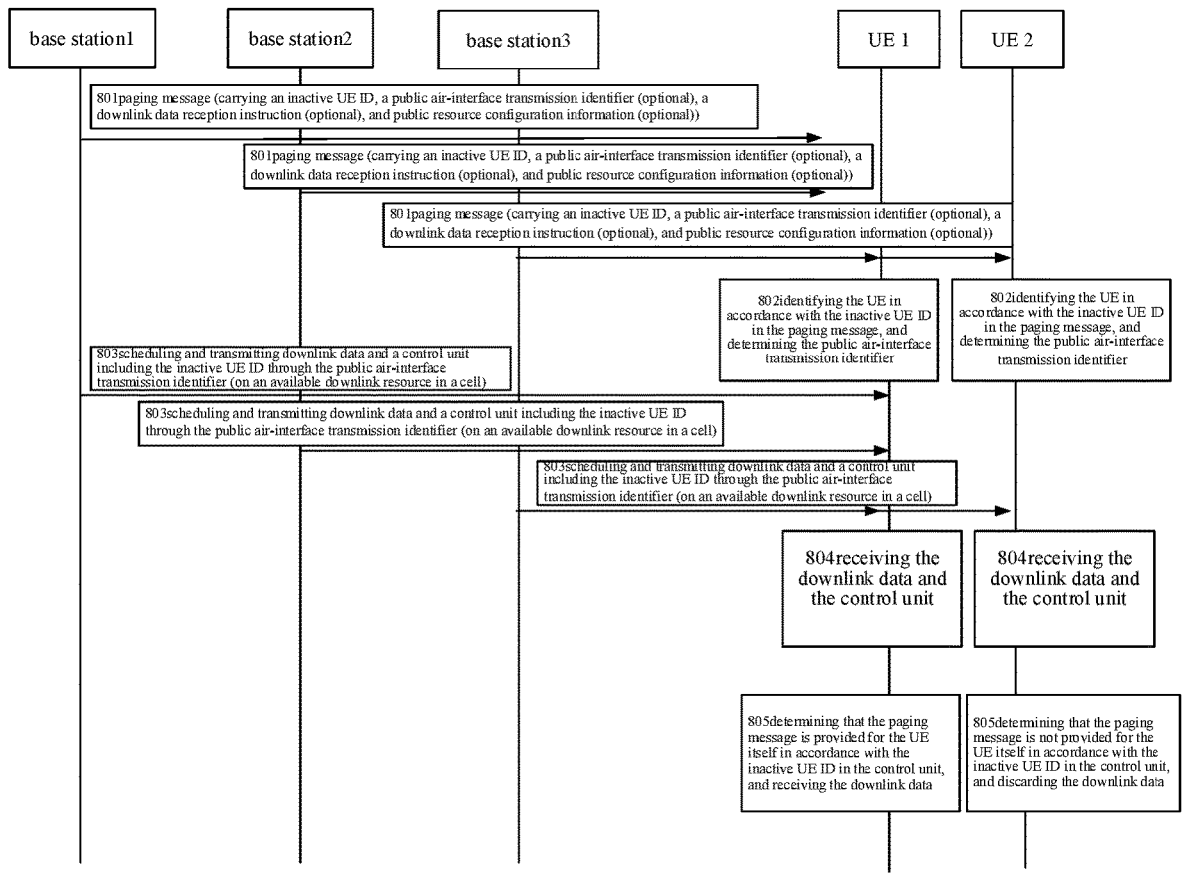
FIG. 8 is still yet another flow chart of the downlink data transmission method according to some embodiments of the present disclosure.

As shown in FIG. 8, the present disclosure further provides in some embodiments a downlink data transmission method, which includes the following steps.

Step 801: transmitting, by a base station (or a plurality of base stations) a paging message. The paging message may carry (1) a unique UE identifier at a certain region, i.e., an inactive UE ID, (2) a public air-interface transmission identifier, e.g., a CB-RNTI, (3) a downlink data reception instruction (optional), and (4) public resource configuration information (optional).

The public air-interface transmission identifier may be carried in the paging message optionally. The public air-interface transmission identifier may also be pre-configured for a UE, agreed in a protocol, or determined through a system broadcast message. When the base station transmits the downlink data to the UE immediately after the UE has received the air-interface transmission identifier, the downlink data reception instruction may not be carried in the paging message. The public resource configuration information may be carried in the paging message optionally. The public resource configuration information may be pre-configured for the UE, agreed in a protocol, configured for the UE when the UE is in a connected state, or notified to all the UEs through a system message.

Step 802: receiving, by the UE, the paging message from the base station, determining whether the paging message is provided for the UE itself in accordance with the inactive UE ID in the paging message, and when the paging message is provided for the UE itself, determining the public air-interface transmission identifier.

Step 803: when the paging message includes the public resource configuration information, scheduling, by the base station (or the base stations), downlink transmission through the public air-interface transmission identifier on a configured public downlink resource, and transmitting a control unit including the inactive UE ID and downlink data on a downlink resource indicated by a downlink scheduling command. The scheduling of the downlink transmission refers to the transmission of the downlink data on the resource indicated by the downlink scheduling command.

To be specific, the base station (or the base stations) may transmit the downlink scheduling command including the public air-interface transmission identifier to the UE so as to indicate parts of or all public resources for the downlink transmission, and transmit the downlink data and the control unit including the inactive UE ID on the public resources indicated by the downlink scheduling command.

When the paging message does not include the public resource configuration information, the base station (or the base stations) may transmit the downlink scheduling command including the public air-interface transmission identifier to the UE, and transmit the downlink data and the control unit including the inactive UE ID to the UE on a resource indicated by the downlink scheduling command.

Step 804: when the paging message includes the public resource configuration information, receiving, by the UE, the downlink scheduling command including the public air-interface transmission identifier on the configured public downlink resource in a cell where the paging message has been received, and receiving the downlink data and the control unit including the inactive UE ID on the downlink resource indicated by the downlink scheduling command.

To be specific, the UE may receive the downlink scheduling command including the public air-interface transmission identifier from a first base station so as to indicate parts of or all public resources for the downlink transmission, and receive the downlink data and the control unit including the inactive UE ID on the public resources indicated by the downlink scheduling command.

When the paging message does not include the public resource configuration information, the UE may receive the downlink scheduling command including the public air-interface transmission identifier from the first base station, and receive the downlink data and the control unit including the inactive UE ID on a resource indicated by the downlink scheduling command.

Step 805: when the inactive UE ID carried in the downlink transmission received by the UE matches an inactive UE ID of the UE, receiving and parsing the downlink data, and otherwise, discarding the downlink data.

There is a definite time relationship between a moment when the UE starts to receive the downlink data and a moment when the paging message is transmitted, e.g., within a same TTI, or TTIs having definite time offsets.

Figure 9:
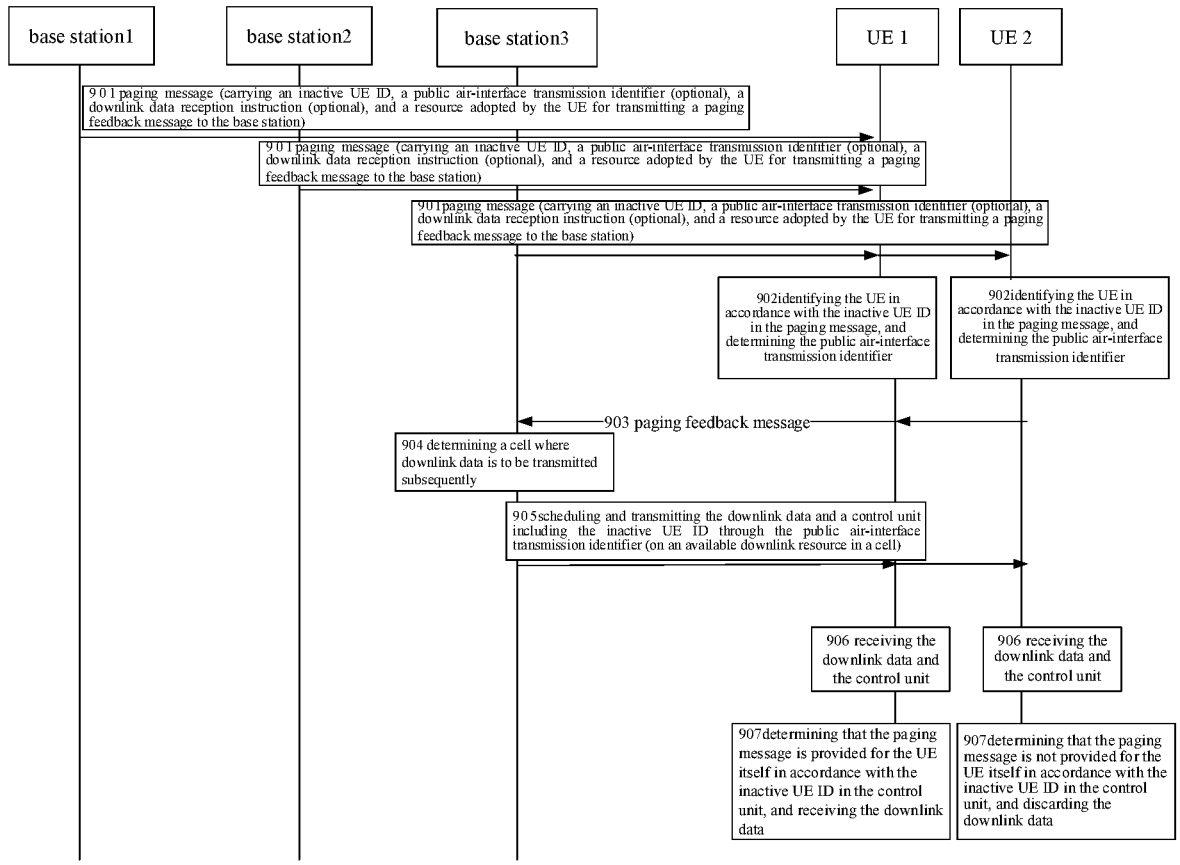
FIG. 9 is still yet another flow chart of the downlink data transmission method according to some embodiments of the present disclosure.

As shown in FIG. 9, the present disclosure further provides in some embodiments a downlink data transmission method, which includes the following steps.

Step 901: transmitting, by a base station (or a plurality of base stations) a paging message. The paging message may carry (1) a unique UE identifier at a certain region, i.e., an inactive UE ID, (2) a public air-interface transmission identifier (optional), (3) a downlink data reception instruction (optional), and (4) a resource adopted by a UE for transmitting a paging feedback message to the base station.

The public air-interface transmission identifier may be carried in the paging message optionally. The public air-interface transmission identifier may be pre-configured for the UE, agreed in a protocol, or determined through a system broadcast message. When the base station transmits the downlink data to the UE immediately after the UE has received the air-interface transmission identifier, the downlink data reception instruction may not be carried in the paging message.

Step 902: receiving, by the UE, the paging message from the base station, identifying the UE in accordance with the inactive UE ID in the paging message, and determining whether the paging message is provided for the UE itself, and when the paging message is provided for the UE itself, determining the public air-interface transmission identifier and an uplink resource for the paging feedback message.

Step 903: transmitting, by the UE, the paging feedback message on the uplink resource allocated by the base station, so as to determine the base station from which downlink data is to be received subsequently.

Step 904: receiving, by the base station, the paging feedback message from the UE, so as to determine a cell where the downlink data is to be transmitted subsequently.

Step 905: scheduling, by the base station (which has received the paging feedback message), downlink transmission through the public air-interface transmission identifier on an available downlink resource in the cell, and transmitting a control unit including the inactive UE ID and the downlink data to the UE on a downlink resource indicated by a downlink scheduling command.

To be specific, the base station which has received the paging feedback message may transmit the downlink scheduling command including the public air-interface transmission identifier to the UE, and transmit the downlink data and the control unit including the inactive UE ID to the UE on the resource indicated by the downlink scheduling command.

Step 906: receiving, by the UE, the downlink scheduling command including the public air-interface transmission identifier on the available downlink resource in the cell where the paging message has been received, and receiving the downlink data and the control unit including the inactive UE ID on the downlink resource indicated by the downlink scheduling command.

To be specific, the UE may receive the downlink scheduling command including the public air-interface transmission identifier from the base station in Step 905, and receive the downlink data and the control unit including the inactive UE ID on the resource indicated by the downlink scheduling command.

Step 907: when the inactive UE ID carried in the downlink transmission received by the UE matches an inactive UE ID of the UE, receiving and parsing the downlink data, and otherwise, discarding the downlink data.

There is a definite time relationship between a moment when the UE starts to receive the downlink data and a moment when the paging message is transmitted, e.g., within a same TTI, or TTIs having definite time offsets.

Figure 10:
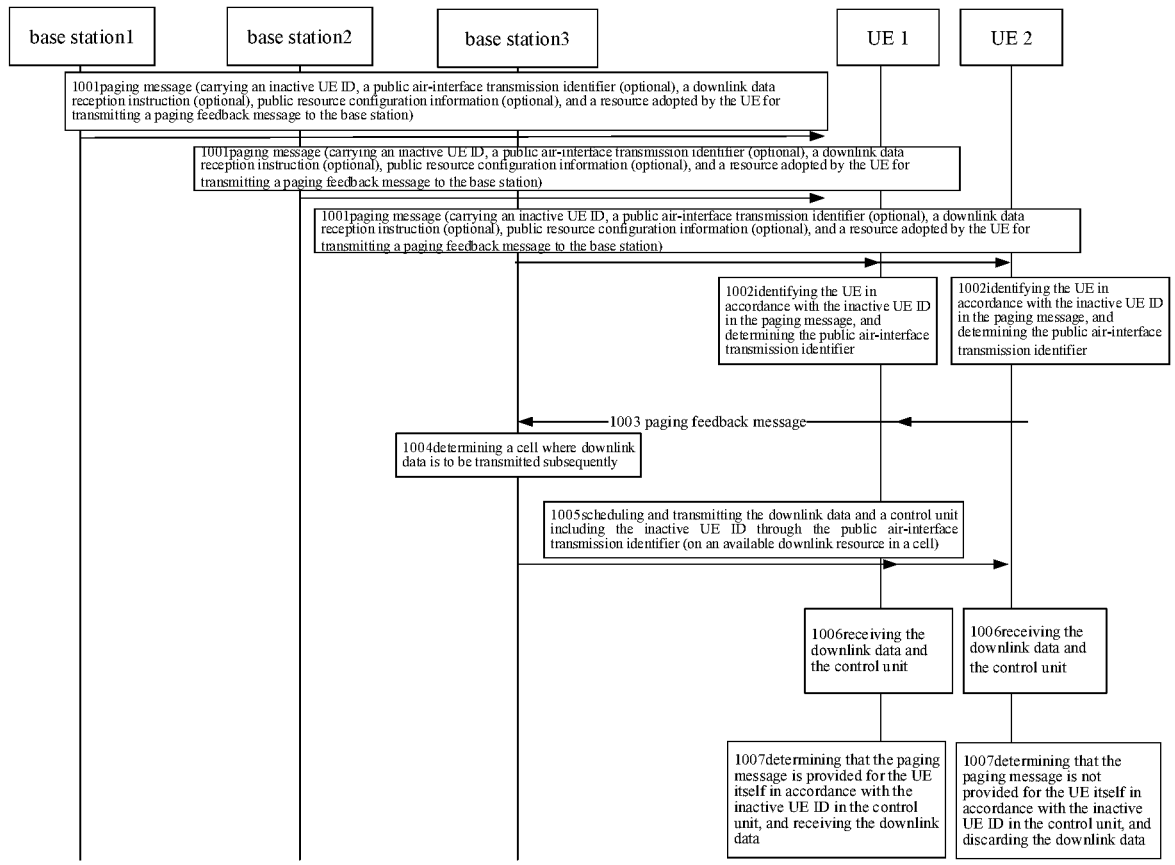
FIG. 10 is still yet another flow chart of the downlink data transmission method according to some embodiments of the present disclosure.

As shown in FIG. 10, the present disclosure further provides in some embodiments a downlink data transmission method, which includes the following steps.

Step 1001: transmitting, by a base station (or a plurality of base stations) a paging message. The paging message may carry (1) a unique UE identifier at a certain region, i.e., an inactive UE ID, (2) a public air-interface transmission identifier, (3) a downlink data reception instruction (optional), (4) public resource configuration information (optional), and (5) a resource adopted by a UE for transmitting a paging feedback message to the base station.

The public air-interface transmission identifier may be carried in the paging message optionally. The public air-interface transmission identifier may be pre-configured for the UE, agreed in a protocol, or determined through a system broadcast message. When the base station transmits the downlink data to the UE immediately after the UE has received the air-interface transmission identifier, the downlink data reception instruction may not be carried in the paging message. The public resource configuration information may be carried in the paging message optionally. The public resource configuration information may be pre-configured for the UE, agreed in a protocol, configured for the UE when the UE is in a connected state, or notified to all the UEs through a system message.

Step 1002: receiving, by the UE, the paging message from the base station, identifying the UE in accordance with the inactive UE ID in the paging message and determining whether the paging message is provided for the UE itself, and when the paging message is provided for the UE itself, determining the public air-interface transmission identifier and an uplink resource for the paging feedback message.

Step 1003: transmitting, by the UE, the paging feedback message to the base station on the uplink resource allocated by the base station, so as to determine the base station from which downlink data is to be received subsequently.

Step 1004: receiving, by the base station, the paging feedback message from the UE, so as to determine a cell where the downlink data is to be transmitted subsequently.

Step 1005: when the paging message includes the public resource configuration information, scheduling, by the base station (which has received the paging feedback message), downlink transmission through the public air-interface transmission identifier on a public downlink resource configured in the cell, and transmitting a control unit including the inactive UE ID and the downlink data to the UE on a downlink resource indicated by a downlink scheduling command.

To be specific, the base station which has received the paging feedback message may transmit the downlink scheduling command including the unique air-interface transmission identifier to the UE so as to indicate parts of or all public resources for the downlink transmission, and transmitting the downlink data and the control unit including the inactive UE ID to the UE on the public resources indicated by the downlink scheduling command.

When the paging message does not include the public resource configuration information, the base station which has received the paging message may transmit the downlink scheduling command including the public air-interface transmission identifier to the UE, and transmit the downlink data and the control unit including the inactive UE ID to the UE on the resource indicated by the downlink scheduling command.

Step 1006: when the paging message includes the public resource configuration information, receiving, by the UE, the downlink scheduling command including the public air-interface transmission identifier on the configured public downlink resource in the cell where the paging message has been received, and receiving the downlink data and the control unit including the inactive UE ID on a downlink resource indicated by the downlink scheduling command.

To be specific, the UE may receive the downlink scheduling command including the unique air-interface transmission identifier from the base station in Step 1005 so as to indicate parts of or all public resources for the downlink transmission, and receive the downlink data and the control unit including the inactive UE ID on the public resources indicated by the downlink scheduling command.

When the paging message does not include the public resource configuration information, the UE may receive the downlink scheduling command including the unique air-interface transmission identifier from the base station in Step 1005, and receive the downlink data on the resource indicated by the downlink scheduling command.

Step 1007: when the inactive UE ID carried in the downlink transmission received by the UE matches an inactive UE ID of the UE, receiving and parsing the downlink data, and otherwise, discarding the downlink data.

There is a definite time relationship between a moment when the UE starts to receive the downlink data and a moment when the paging message is transmitted, e.g., within a same TTI, or TTIs having definite time offsets.

According to the embodiments of the present disclosure, when the downlink data needs to be transmitted to the UE which has not been connected to any individual cell yet, it is able to prevent the occurrence of data transmission delay as compared with the related art where the subsequent data transmission is performed merely when the UE has entered a RRC connected state and acquired a C-RNTI, thereby to transmit the data rapidly and reduce the data transmission delay.

Figure 11:
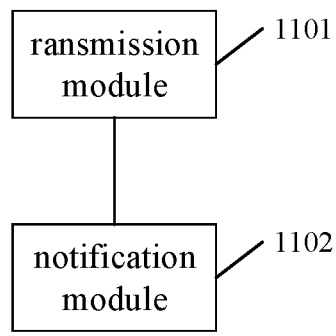
FIG. 11 is a schematic view showing a downlink data transmission device according to some embodiments of the present disclosure.

As shown in FIG. 11, the present disclosure further provides in some embodiments a downlink data transmission device, which includes: a transmission module 1101 configured to transmit a paging message to a UE which has not been connected to any individual cell when downlink data is to be transmitted to the UE; and a notification module 1102 configured to notify the UE to receive the downlink data.

As mentioned above, in a possible embodiment of the present disclosure, the paging message includes: an inactive UE ID and a unique UE air-interface transmission identifier; or the inactive UE ID, the unique UE air-interface transmission identifier, and a combination of a downlink data reception instruction and a public resource configuration information; or the inactive UE ID, the unique UE air-interface transmission identifier, and resource information adopted by the UE for transmitting a paging feedback message to a base station; or the inactive UE ID, the unique UE air-interface transmission identifier, the source information adopted by the UE for transmitting the paging feedback message to the base station, and a combination of the downlink data reception instruction and the public resource configuration information.

Figure 12:
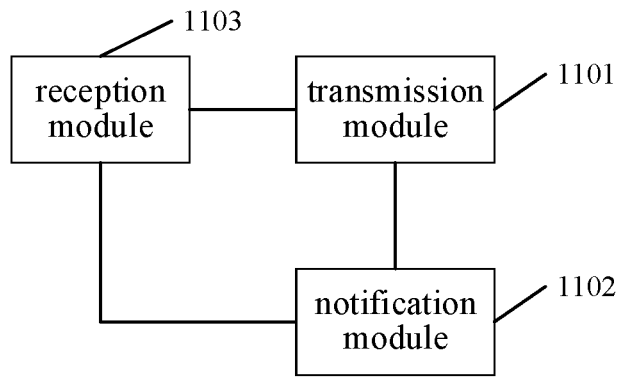
FIG. 12 is another schematic view showing the downlink data transmission device according to some embodiments of the present disclosure.

When the paging message includes the resource information adopted by the UE for transmitting the paging feedback message to the base station, as shown in FIG. 12, the downlink data transmission device further includes a reception module 1103 configured to receive the paging feedback message from the UE.

When the paging message does not include the public resource configuration information, the notification module 1102 includes: a command transmission sub-module configured to transmit a downlink scheduling command to the UE, the downlink scheduling command including the unique UE air-interface transmission identifier; and a data transmission sub-module configured to transmit the downlink data on a resource indicated by the downlink scheduling command.

When the paging message includes the public resource configuration information, the notification module 1102 includes: a command transmission sub-module configured to transmit a downlink scheduling command to the UE so as to indicate parts of or all public resources for the downlink transmission, the downlink scheduling command including the unique UE air-interface transmission identifier; and a data transmission sub-module configured to transmit the downlink data on the public resources indicated by the downlink scheduling command.

As mentioned above, in another possible embodiment of the present disclosure, the paging message includes: an inactive UE ID; or the inactive UE ID and a combination of a public air-interface transmission identifier, a downlink data reception instruction and public resource configuration information; or the inactive UE ID and a resource adopted by the UE for transmitting a paging feedback message to a base station; or the inactive UE ID, the resource adopted by the UE for transmitting the paging feedback message to the base station, and a combination of the public air-interface transmission identifier, the downlink data reception instruction and the public resource configuration information.

As shown in FIG. 12, when the paging message includes the resource adopted by the UE for transmitting the paging feedback message to the base station, the downlink data transmission device 1103 further includes a reception module configured to receive the paging feedback message from the UE.

When the paging message does not include the public resource configuration information, the notification module 1102 includes: a command transmission sub-module configured to transmit a downlink scheduling command to the UE, the downlink scheduling command including the public air-interface transmission identifier; and a data transmission sub-module configured to transmit the downlink data and a control unit including the inactive UE ID on a resource indicated by the downlink scheduling command.

When the paging message includes the public resource configuration information, the notification module 1102 includes: a command transmission sub-module configured to transmit a downlink scheduling command to the UE so as to indicate parts of or all public resources for the downlink transmission, the downlink scheduling command including the unique air-interface transmission identifier; and a data transmission sub-module configured to transmit the downlink data and a control unit including the inactive UE ID on the public resources indicated by the downlink scheduling command.

An operating principle of the downlink data transmission device may refer to that mentioned in the method embodiments, and the downlink data transmission device may be arranged in a base station.

According to the embodiments of the present disclosure, when the downlink data needs to be transmitted to the UE which has not been connected to any individual cell yet, it is able to prevent the occurrence of data transmission delay as compared with the related art where the subsequent data transmission is performed merely when the UE has entered a RRC connected state and acquired a C-RNTI, thereby to transmit the data rapidly and reduce the data transmission delay.

Figure 13:
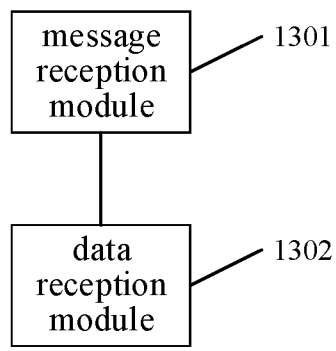
FIG. 13 is a schematic view showing a downlink data transmission device according to some embodiments of the present disclosure.

As shown in FIG. 13, the present disclosure further provides in some embodiments a downlink data transmission device, which includes: a message reception module 1301 configured to receive paging messages from one or more base stations; and a data reception module 1302 configured to receive downlink data from a first base station of the one or more base stations.

As mentioned above, in a possible embodiment of the present disclosure, each paging message includes: an inactive UE ID and a unique UE air-interface transmission identifier; or the inactive UE ID, the unique UE air-interface transmission identifier, and a combination of a downlink data reception instruction and public resource configuration information.

In a possible embodiment of the present disclosure, the message reception module 1301 includes: a determination sub-module configured to determine whether each paging message is provided for a UE itself in accordance with the inactive UE ID in the paging message; and an identifier acquisition sub-module configured to, when the paging message is provided for the UE itself, acquire the unique UE air-interface transmission identifier in the paging message.

In a possible embodiment of the present disclosure, when the paging message does not include the public resource configuration information, the data reception module includes: a command reception sub-module configured to receive a downlink scheduling command from the first base station, the downlink scheduling command including the unique UE air-interface transmission identifier; and a data reception sub-module configured to receive the downlink data on a resource indicated by the downlink scheduling command. When the paging message includes the public resource configuration information, the data reception module 1302 includes: a command reception sub-module configured to receive a downlink scheduling command from the first base station so as to indicate parts of or public resources for the downlink transmission, the downlink scheduling command including the unique UE air-interface transmission identifier; and a data reception sub-module configured to receive the downlink data on the public resources indicated by the downlink scheduling command.

As mentioned above, in another possible embodiment of the present disclosure, the paging message includes: an inactive UE ID, a unique UE air-interface transmission identifier and a resource adopted by the UE for transmitting a paging feedback message to the base station; or the inactive UE ID, the unique UE air-interface transmission identifier, the resource adopted by the UE for transmitting the paging feedback message to the base station, and a combination of a downlink data reception instruction and public resource configuration information.

In a possible embodiment of the present disclosure, the message reception module 1301 includes: a determination sub-module configured to determine whether each paging message is provided for a UE itself in accordance with the inactive UE ID in the paging message; and an acquisition sub-module configured to, when the paging message is provided for the UE itself, acquire the unique UE air-interface transmission identifier in the paging message, and determine an uplink resource for the paging feedback message in accordance with the resource adopted by the UE for transmitting the paging feedback message to the base station.

Figure 14:
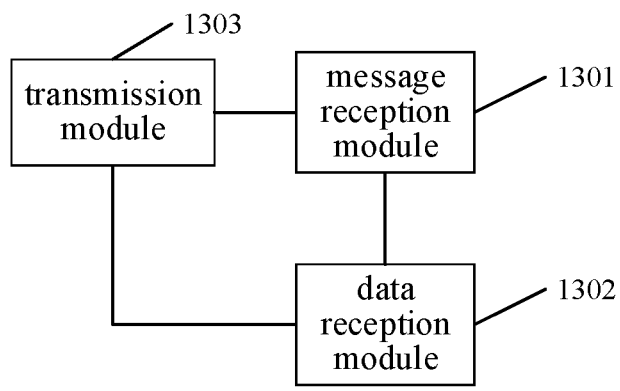
FIG. 14 is another schematic view showing the downlink data transmission device according to some embodiments of the present disclosure.

At this time, as shown in FIG. 14, when the paging message includes the resource adopted by the UE for transmitting the paging feedback message to the base station, the downlink data transmission device further includes a transmission module 1303 configured to transmit the paging feedback message on the uplink resource of the paging feedback message.

When the paging message does not include the public resource configuration information, the data reception module 1302 includes: a command reception sub-module configured to receive a downlink scheduling command from the base station, the downlink scheduling command including the unique UE air-interface transmission identifier, the first base station being a base station which has received the paging feedback message; and a data reception sub-module configured to receive the downlink data on a resource indicated by the downlink scheduling command. When the paging message includes the public resource configuration information, the data reception module 1302 includes: a command reception sub-module configured to receive a downlink scheduling command from the first base station so as to indicate parts of or all public resources for the downlink transmission, the downlink scheduling command including the unique UE air-interface transmission identifier, the first base station being a base station which has received the paging feedback message; and a data reception sub-module configured to receive the downlink data on the public resources indicated by the downlink scheduling command.

In yet another possible embodiment of the present disclosure, the paging message includes: an inactive UE ID; or the inactive UE ID, and a combination of a public air-interface transmission identifier, a downlink data reception instruction and public resource configuration information.

In a possible embodiment of the present disclosure, the message reception module 1301 includes: a determination sub-module configured to determine whether the paging message is provided for the UE itself in accordance with the inactive UE ID in the paging message; and an identifier acquisition sub-module configured to, when the paging message is provided for the UE itself and includes the public air-interface transmission identifier, acquire the public air-interface transmission identifier in the paging message, and otherwise acquire a predetermined public air-interface transmission identifier.

When the paging message does not include the public resource configuration information, the data reception module 1303 includes: a command reception sub-module configured to receive a downlink scheduling command from the first base station, the downlink scheduling command including the public air-interface transmission identifier; a data reception sub-module configured to receive the downlink data and a control unit including an inactive UE ID on a resource indicated by the downlink scheduling command; and a data acquisition sub-module configured to compare the inactive UE ID in the control unit with the inactive UE ID in the paging message, and when they are consistent with each other, acquire the downlink data.

When the paging message includes the public resource configuration information, the data reception module 1303 includes: a command reception sub-module configured to receive a downlink scheduling command from the first base station so as to indicate parts of or all public resources for the downlink transmission, the downlink scheduling command including the public air-interface transmission identifier; a data reception sub-module configured to receive the downlink data and a control unit including an inactive UE ID on the public resources indicated by the downlink scheduling command; and a data acquisition sub-module configured to compare the inactive UE ID in the control unit with the inactive UE ID in the paging message, and when they are consistent with each other, acquire the downlink data.

In still yet another possible embodiment of the present disclosure, the paging message includes: an inactive UE ID and a resource adopted by a UE for transmitting a paging feedback message to the base station; or the inactive UE ID, the resource adopted by the UE for transmitting the paging feedback message to the base station, and a combination of a public air-interface transmission identifier, a downlink data reception instruction and public resource configuration information.

As shown in FIG. 14, the downlink data transmission device further includes a transmission module 1304 configured to transmit the paging feedback message on an uplink resource of the paging feedback message.

The message reception module 1301 includes: a determination sub-module configured to determine whether the paging message is provided for the UE itself in accordance with the inactive UE ID in the paging message; an acquisition sub-module configured to, when the paging message is provided for the UE itself and includes the public air-interface transmission identifier, acquire the public air-interface transmission identifier in the paging message, and otherwise acquire a predetermined public air-interface transmission identifier; and a resource determination sub-module configured to determine the uplink resource of the paging feedback message in accordance with the resource adopted by the UE for transmitting the paging feedback message to the base station.

When the paging message does not include the public resource configuration information, the data reception module 1302 includes: a command reception sub-module configured to receive a downlink scheduling command from the first base station, the downlink scheduling command including the public air-interface transmission identifier; a data reception sub-module configured to receive the downlink data and a control unit including an inactive UE ID on a resource indicated by the downlink scheduling command; and a data acquisition sub-module configured to compare the inactive UE ID in the control unit with a pre-stored inactive UE ID, and when they are consistent with each other, acquire the downlink data.

When the paging message includes the public resource configuration information, the data reception module 1302 includes: a command reception sub-module configured to receive a downlink scheduling command from the first base station so as to indicate parts of or all public resources for the downlink transmission, the downlink scheduling command including the public air-interface transmission identifier; a data reception sub-module configured to receive the downlink data and a control unit including an inactive UE ID on the public resources indicated by the downlink scheduling command; and a data acquisition sub-module configured to compare the inactive UE ID in the control unit with the inactive UE ID in the paging message, and when they are consistent with each other, acquire the downlink data.

An operating principle of the downlink data transmission device may refer to that mentioned in the above method embodiments, and the downlink data transmission device may be arranged in a UE.

According to the embodiments of the present disclosure, when the downlink data needs to be transmitted to the UE which has not been connected to any individual cell yet, it is able to prevent the occurrence of data transmission delay as compared with the related art where the subsequent data transmission is performed merely when the UE has entered a RRC connected state and acquired a C-RNTI, thereby to transmit the data rapidly and reduce the data transmission delay.

The present disclosure further provides in some embodiments a downlink data transmission device, including a processor, and a memory connected to the processor through a bus interface. The memory is configured to store therein programs and data for the operation of the processor. The processor is configured to call and execute the programs and data stored in the memory, so as to implement the following functional modules and units: a transmission module, configured to transmit a paging message to a UE which has not been connected to any individual cell when downlink data is to be transmitted to the UE; and a notification module, configured to notify the UE to receive the downlink data.

The present disclosure further provides in some embodiments a downlink data transmission device, including a processor, and a memory connected to the processor through a bus interface. The memory is configured to store therein programs and data for the operation of the processor. The processor is configured to call and execute the programs and data stored in the memory, so as to implement the following functional modules and units: a message reception module, configured to receive paging messages from one or more base stations; and a data reception module, configured to receive downlink data from a first base station among the one or more base stations.

It should be appreciated that, the downlink data transmission device in the embodiments of the present disclosure is capable of implementing the above-mentioned downlink data transmission method, so all the embodiments about a paging method on the basis of network partition may also be applied to the downlink data transmission device, with a same or similar beneficial effect.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A downlink data transmission method, comprising:
    transmitting a paging message to a User Equipment (UE) which is in an inactive state when downlink data is to be transmitted to the UE, the paging message comprising an inactive UE Identity (ID); and
    notifying the UE to receive the downlink data by transmitting a downlink scheduling command comprising a unique or public UE air-interface transmission identifier,
    wherein in the inactive state, the UE maintains its connection with a core network, but there is no connection between the UE and any individual cell for data transmission,
    wherein the paging message comprises:
    an inactive UE ID; or
    the inactive UE ID and any combination of a public air-interface transmission identifier, a downlink data reception instruction and public resource configuration information; or
    the inactive UE ID and a resource adopted by the UE for transmitting a paging feedback message to a base station; or
    the inactive UE ID, the resource adopted by the UE for transmitting the paging feedback message to the base station, and any combination of the public air-interface transmission identifier, the downlink data reception instruction and the public resource configuration information, wherein when the paging message does not comprise the public resource configuration information, the notifying the UE to receive the downlink data comprises: transmitting a downlink scheduling command to the UE, the downlink scheduling command comprising the public air-interface transmission identifier; and transmitting the downlink data and a control unit comprising the inactive UE ID on a resource indicated by the downlink scheduling command; when the paging message comprises the public resource configuration information, the notifying the UE to receive the downlink data comprises: transmitting a downlink scheduling command to the UE so as to indicate parts of or all public resources for the downlink transmission, the downlink scheduling command comprising the public air-interface transmission identifier; and transmitting the downlink data and a control unit comprising the inactive UE ID on the public resources indicated by the downlink scheduling command.

2. The downlink data transmission method according to claim 1, wherein the paging message comprises:
   an inactive UE Identity (ID) and a unique UE air-interface transmission identifier;
   or
   the inactive UE ID, the unique UE air-interface transmission identifier, and a combination of a downlink data reception instruction and a public resource configuration information; or
   the inactive UE ID, the unique UE air-interface transmission identifier, and resource information adopted by the UE for transmitting a paging feedback message to a base station; or
   the inactive UE ID, the unique UE air-interface transmission identifier, the resource information adopted by the UE for transmitting the paging feedback message to the base station, and a combination of the downlink data reception instruction and the public resource configuration information.

3. The downlink data transmission method according to claim 2, wherein when the paging message does not comprise the public resource configuration information and the resource information adopted by the UE for transmitting the paging feedback message to the base station, the notifying the UE to receive the downlink data comprises:
   transmitting a downlink scheduling command to the UE, the downlink scheduling command comprising the unique UE air-interface transmission identifier; and
   transmitting the downlink data on a resource indicated by the downlink scheduling command.

4. The downlink data transmission method according to claim 2, wherein when the paging message comprises the public resource configuration information but does not comprise the resource information adopted by the UE for transmitting the paging feedback message to the base station, the notifying the UE to receive the downlink data comprises:
   transmitting a downlink scheduling command to the UE so as to indicate parts of or all public resources for the downlink transmission, the downlink scheduling command comprising the unique UE air-interface transmission identifier; and
   transmitting the downlink data on the public resources indicated by the downlink scheduling command.

5. The downlink data transmission method according to claim 2, wherein when the paging message comprises the resource information adopted by the UE for transmitting the paging feedback message to the base station, subsequent to transmitting the paging message to the UE, the downlink data transmission method further comprises receiving the paging feedback message from the UE.

6. The downlink data transmission method according to claim 5, wherein when the paging message does not comprise the public resource configuration information, the notifying the UE to receive the downlink data comprises:
   transmitting, by the base station which has received the paging feedback message, a downlink scheduling command to the UE, the downlink scheduling command comprising the unique UE air-interface transmission identifier; and
   transmitting, by the base station which has received the paging feedback message, the downlink data on a resource indicated by the downlink scheduling command.

7. The downlink data transmission method according to claim 5, wherein when the paging message comprises the public resource configuration information, the notifying the UE to receive the downlink data comprises:
   transmitting, by the base station which has received the paging feedback message, a downlink scheduling command to the UE so as to indicate parts of or all public resources for the downlink transmission, the downlink scheduling command comprising the unique UE air-interface transmission identifier; and
   transmitting, by the base station which has received the paging feedback message, the downlink data on the public resources indicated by the downlink scheduling command.

8. The downlink data transmission method according to claim 1, wherein when the paging message comprises the resource adopted by the UE for transmitting the paging feedback message to the base station, subsequent to transmitting the paging message to the UE, the downlink data transmission method further comprises receiving the paging feedback message from the UE.

9. The downlink data transmission method according to claim 8, wherein when the paging message does not comprise the public resource configuration information, the notifying the UE to receive the downlink data comprises:
   transmitting, by the base station which has received the paging feedback message, a downlink scheduling command to the UE, the downlink scheduling command comprising the public air-interface transmission identifier; and
   transmitting, by the base station which has received the paging feedback message, the downlink data and a control unit comprising the inactive UE ID on a resource indicated by the downlink scheduling command.

10. The downlink data transmission method according to claim 8, wherein when the paging message comprises the public resource configuration information, the notifying the UE to receive the downlink data comprises:
    transmitting, by the base station which has received the paging feedback message, a downlink scheduling command to the UE so as to indicate parts of or all public resources for the downlink transmission, the downlink scheduling command comprising the public air-interface transmission identifier; and
    transmitting, by the base station which has received the paging feedback message, the downlink data and a control unit comprising the inactive UE ID on the public resources indicated by the downlink scheduling command.

11. A downlink data transmission method, comprising:
receiving paging messages from one or more base stations, the paging message comprising an inactive UE Identity (ID); and
receiving downlink data from a first base station among the one or more base stations by receiving a downlink scheduling command comprising a unique or public UE air-interface transmission identifier,
wherein in an inactive state of a UE, the UE maintains its connection with a core network, but there is no connection between the UE and any individual cell for data transmission,
wherein the paging message comprises:
an inactive UE ID; or
the inactive UE ID and any combination of a public air-interface transmission identifier, a downlink data reception instruction and public resource configuration information; or
the inactive UE ID and a resource adopted by the UE for transmitting a paging feedback message to a base station; or
the inactive UE ID, the resource adopted by the UE for transmitting the paging feedback message to the base station, and any combination of the public air-interface transmission identifier, the downlink data reception instruction and the public resource configuration information,
wherein when the paging message does not comprise the public resource configuration information, the receiving downlink data by receiving a downlink scheduling command comprises: receiving a downlink scheduling command, the downlink scheduling command comprising the public air-interface transmission identifier; and receiving the downlink data and a control unit comprising the inactive UE ID on a resource indicated by the downlink scheduling command; when the paging message comprises the public resource configuration information, the receiving the downlink data comprises: receiving a downlink scheduling command for indicating parts of or all public resources for the downlink transmission, the downlink scheduling command comprising the public air-interface transmission identifier; and receiving the downlink data and a control unit comprising the inactive UE ID on the public resources indicated by the downlink scheduling command.

12. A downlink data transmission device, comprising a processor, and a memory connected to the processor through a bus interface, wherein the memory is configured to store therein programs and data for the operation of the processor, wherein the processor is configured to call and execute the programs and data stored in the memory, so as to: transmit a paging message to a UE which is in an inactive state when downlink data is to be transmitted to the UE, the paging message comprising an inactive UE Identity (ID); and notify the UE to receive the downlink data by transmitting a downlink scheduling command comprising a unique or public UE air-interface transmission identifier,
wherein in the inactive state, the UE maintains its connection with a core network, but there is no connection between the UE and any individual cell for data transmission,
wherein the paging message comprises:
an inactive UE ID; or
the inactive UE ID and any combination of a public air-interface transmission identifier, a downlink data reception instruction and public resource configuration information; or
the inactive UE ID and a resource adopted by the UE for transmitting a paging feedback message to a base station; or
the inactive UE ID, the resource adopted by the UE for transmitting the paging feedback message to the base station, and any combination of the public air-interface transmission identifier, the downlink data reception instruction and the public resource configuration information,
wherein when the paging message does not comprise the public resource configuration information, the notifying the UE to receive the downlink data comprises: transmitting a downlink scheduling command to the UE, the downlink scheduling command comprising the public air-interface transmission identifier; and transmitting the downlink data and a control unit comprising the inactive UE ID on a resource indicated by the downlink scheduling command; when the paging message comprises the public resource configuration information, the notifying the UE to receive the downlink data comprises: transmitting a downlink scheduling command to the UE so as to indicate parts of or all public resources for the downlink transmission, the downlink scheduling command comprising the public air-interface transmission identifier; and transmitting the downlink data and a control unit comprising the inactive UE ID on the public resources indicated by the downlink scheduling command.

13. A downlink data transmission device, comprising a processor, and a memory connected to the processor through a bus interface, wherein the memory is configured to store therein programs and data for the operation of the processor, wherein the processor is configured to call and execute the programs and data stored in the memory, so as to: receive paging messages from one or more base stations, the paging message comprising an inactive UE Identity (ID); and receive downlink data from a first base station among the one or more base stations by receiving a downlink scheduling command comprising a unique or public UE air-interface transmission identifier,
wherein in an inactive state of a UE, the UE maintains its connection with a core network, but there is no connection between the UE and any individual cell for data transmission,
wherein the paging message comprises:
an inactive UE ID; or
the inactive UE ID and any combination of a public air-interface transmission identifier, a downlink data reception instruction and public resource configuration information; or
the inactive UE ID and a resource adopted by the UE for transmitting a paging feedback message to a base station; or
the inactive UE ID, the resource adopted by the UE for transmitting the paging feedback message to the base station, and any combination of the public air-interface transmission identifier, the downlink data reception instruction and the public resource configuration information,
wherein when the paging message does not comprise the public resource configuration information, the receiving downlink data by receiving a downlink scheduling command comprises: receiving a downlink scheduling command, the downlink scheduling command comprising the public air-interface transmission identifier; and receiving the downlink data and a control unit comprising the inactive UE ID on a resource indicated by the downlink scheduling command; when the paging message comprises the public resource configuration information, the receiving the downlink data comprises: receiving a downlink scheduling command for indicating parts of or all public resources for the downlink transmission, the downlink scheduling command comprising the public air-interface transmission identifier; and receiving the downlink data and a control unit comprising the inactive UE ID on the public resources indicated by the downlink scheduling command.

* * * * *